(12) United States Patent
Choi

(10) Patent No.: US 12,120,799 B2
(45) Date of Patent: Oct. 15, 2024

(54) REMOTELY PERFORMANCE DIRECTING SYSTEM AND METHOD THEREOF

(71) Applicant: Ji Sun Choi, Seoul (KR)

(72) Inventor: Ji Sun Choi, Seoul (KR)

( * ) Notice: Subject to any disclaimer, the term of this patent is extended or adjusted under 35 U.S.C. 154(b) by 65 days.

(21) Appl. No.: 18/046,630

(22) Filed: Oct. 14, 2022

(65) Prior Publication Data
US 2023/0117158 A1   Apr. 20, 2023

Related U.S. Application Data

(63) Continuation of application No. PCT/KR2021/004785, filed on Apr. 16, 2021.

(30) Foreign Application Priority Data

Apr. 17, 2020   (KR) .................. 10-2020-0046889

(51) Int. Cl.
*H05B 47/19*   (2020.01)
*A63J 5/02*   (2006.01)

(52) U.S. Cl.
CPC ............. *H05B 47/19* (2020.01); *A63J 5/02* (2013.01)

(58) Field of Classification Search
CPC ...... A63H 37/00; F21V 33/008; G06Q 50/10; H04N 21/2743; H04W 4/021; H05B 47/105; H05B 47/155; H05B 47/175; H05B 47/19; Y02B 20/40

See application file for complete search history.

(56) References Cited

U.S. PATENT DOCUMENTS

| 2014/0184066 A1 | 7/2014 | Teramoto et al. |
| 2016/0277781 A1* | 9/2016 | Lennon .......... H04N 21/234363 |
| 2018/0049287 A1* | 2/2018 | Lu ........................ F21K 9/238 |

(Continued)

FOREIGN PATENT DOCUMENTS

| JP | 2015-011981 A | 1/2015 |
| JP | 2015-208027 A | 11/2015 |

(Continued)

OTHER PUBLICATIONS

Machine Translation of JP-2019097031-A (Year: 2019).*

(Continued)

*Primary Examiner* — Raymond R Chai
(74) *Attorney, Agent, or Firm* — Studebaker & Brackett PC

(57) ABSTRACT

Disclosed is a remote location directing system. The remote location directing system includes a control console device that generates performance data performed in a performance hall and control data for controlling to-be-controlled devices at a remote location based on performance directing data, a data processing device that provides the performance data to spectators at the remote location and process the control data synchronized with the performance data together with the performance data, and to-be-controlled devices that are controlled to correspond to the performance data based on the control data corresponding to a current playback section of the performance data, wherein the control data is configured by mapping time code information to the control data to be synchronized with the performance data using the time code information, and the to-be-controlled devices are possessed by the spectators at the remote location.

8 Claims, 10 Drawing Sheets

(56) References Cited

U.S. PATENT DOCUMENTS

2021/0076471 A1* 3/2021 Kwon .................. G09G 3/2074
2021/0084737 A1* 3/2021 Choi ...................... H05B 47/19

FOREIGN PATENT DOCUMENTS

| JP | 2017-168961 A | | 9/2017 |
|----|---------------|---|--------|
| JP | 2018-005977 A | | 1/2018 |
| JP | 2019097031 A | * | 6/2019 |
| KR | 10-2000-0012267 A | | 3/2000 |
| KR | 10-2018-0015703 A | | 2/2018 |
| KR | 10-2019-0070220 A | | 6/2019 |
| KR | 10-2020-0000794 A | | 1/2020 |

OTHER PUBLICATIONS

"Notice of Submission of Opinions" Office Action issued in KR 10-2020-0046889; mailed by the Korean Intellectual Property Office on Aug. 19, 2021.
An Office Action mailed by the Japan Patent Office on Feb. 6, 2024, which corresponds to Japanese Patent Application No. 2022-562986 and is related to U.S. Appl. No. 18/046,630; with English translation.

* cited by examiner

REMOTELY PERFORMANCE DIRECTING SYSTEM AND METHOD THEREOF

CROSS-REFERENCE TO RELATED APPLICATIONS

This application is a Continuation of International Application No. PCT/KR2021/004785 filed Apr. 16, 2021, which claims benefit of priority to Korean Patent Application No. 10-2020-0046889 filed Apr. 17, 2020, the entire contents of which are incorporated herein by reference.

BACKGROUND

The inventive concept relates to a remote location directing system, and more particularly, to a remote location directing system and a remote location directing method for controlling to-be-controlled devices possessed by spectators at a remote location outside the site, such as non-audience performance or filming, or to-be-controlled devices possessed by spectators watching a video or content at the remote location.

In general, a lighting device refers to a light emitting device that achieves the purpose of lighting by reflecting, refracting, and transmitting light from a light source. The lighting device may be classified into an indirect lighting device, a semi-indirect lighting device, a total diffusion lighting device, a semi-direct lighting device, and a direct lighting device according to light distribution.

With technological advancement, lighting devices are being used for various purposes. For example, the lighting device is used to direct a media facade. Media façade refers to implementation of media functions by installing a lighting device on the exterior walls of buildings.

As another example, the lighting device may be used as a small cheering tool or as a means of directing an electronically implemented mass game or audience image in sports events or concerts conducted in an environment of a certain illuminance or less. However, in such an environment, since a plurality of lighting devices are individually controlled, it is difficult to create a systematic lighting pattern or shape. In addition, it is not easy to achieve the expected effect of cheering or immersion just by using the light sources disposed in the lighting devices.

Therefore, in order to specifically solve the above problems, there is a need to introduce a method for collectively controlling a plurality of lighting devices and directing various performances in a performance hall such as an athletic event or a concert through such control.

In addition, there is a need for a method for enabling spectators who could not attend the performance to feel the same experience as in the actual performance by providing, to spectators at a location other than a performance hall (that is, a remote location) various performance directing effects that can be included in the case of performance, live performance, recording, or relay at a concert hall or filming site, or the like. In particular, when there are spectators at the performance site, it is necessary to link and control to-be-controlled device, possessed by spectators at a remote location and externally controlled, and the to-be-controlled devices of on-site spectators. For example, in the case of a non-audience performance, or streaming service such as YouTube, or transmission of recording video, there is a need to provide an environment capable of providing a cheering effect as if watching a performance in the audience seat using the to-be-controlled device even in a remote location by separately controlling the to-be-controlled devices, in which directing effect is designed for the spectators at a remote location.

In addition, in order to provide highly immersive content, there is a need to an environment capable of increasing content immersion and providing additional effect by providing a lighting effect to a lighting device possessed by a viewer at a remote location who watches a video or content at a remote location in correspondence with the progress of the video or content.

SUMMARY

An object to be achieved by the inventive concept is to provide a remote location directing method and a remote location directing system which control to-be-controlled devices of spectators at a remote location outside a non-audience performance or a filming location.

An object to be achieved by the inventive concept is to provide a remote location directing method and a remote location directing system, which control a light emission function, a voice function, a vibration function, or a separate identifiable function of to-be-controlled devices of spectators at a remote location using control data synchronized with performance data.

Another object to be achieved by the inventive concept is to provide a remote location directing method and a remote location directing system, which precisely control to-be-controlled devices of spectators at remote location who want to enjoy the performance in various forms such as real-time or past video or live video materials which are received from the remote location according to timing of a performance video regardless of the presence or absence of on-site spectators at the video shooting site.

Another object to be achieved by the inventive concept is to provide a situation-adaptive remote directing method and remote directing system which combine a video played for spectators at a remote location and a control signal that controls to-be-controlled devices possessed by the spectators at the remote location and transmit them as one data, or transmit them separately.

Another object to be achieved by the inventive concept is to provide a remote location directing method and a remote location directing system that control a plurality of to-be-controlled devices located in a short distance through one device of a spectator when a control signal for controlling a to-be-controlled device possessed by a spectator at a remote location is provided from the spectator at the remote location.

Another object to be achieved by the inventive concept is to provide a remote location directing method and a remote location directing system, which include means for synchronization in a control signal for controlling to-be-controlled devices of spectators at a remote location and therefore provide the to-be-controlled devices precisely synchronized with a video played by the spectator at the remote location.

Another object to be achieved by the inventive concept is to provide a remote location directing method and a remote location directing system, which control the controlled device possessed by the remote viewer to respond to changes or reactions in the video or content and control the light emission capable of providing a controlled device in order to maximize the immersion or content effect of viewers who enjoy content or video in real time or in non-real time at a remote location, not limited to the performance, The objects to be achieved in the inventive concept are not limited to the objects mentioned above, and other objects not mentioned can be clearly understood by those of ordinary skill in the art to which the inventive concept belongs from the description below.

According to an embodiment of the inventive concept, a remote location directing system includes a control console device that generates performance data performed in a performance hall and control data for controlling to-be-controlled devices at a remote location based on non-audience performance directing data, a data processing device that provides the performance data to spectators at the remote location and process the control data synchronized with the performance data together with the performance data, and to-be-controlled devices that are controlled to correspond to the performance data based on the control data corresponding to a current playback section of the performance data, wherein the control data is configured by mapping time code information to the control data to be synchronized with the performance data using the time code information, and the to-be-controlled devices are possessed by the spectators at the remote location.

According to an embodiment, the remote location directing system may include a data processing device for simultaneously processing the performance data and the control data to implement the performance directing effect.

According to an embodiment, the server may simultaneously transmit the control data to the data processing device and the to-be-controlled devices at the remote location.

According to an embodiment, the server may receive the control data for controlling the to-be-controlled devices at the remote location according to the performance data in real time from a control console device located in the performance hall.

According to an embodiment, the performance data may be made in the performance hall without a spectator and remotely provided to a spectator at the remote location.

According to an embodiment, the to-be-controlled devices at the remote location may be controlled based on the control data in correspondence with virtual seats created virtually in the performance hall.

According to an embodiment, the server may generate non-audience performance data by mapping the control data to time code information so as to be synchronized with the performance data using the time code information.

According to an embodiment, the server may generate non-audience performance data by synchronizing the performance data with the control data corresponding to the performance data using a DAW (Digital Audio Workstation) device.

According to an embodiment, the performance data and the control data are provided using a physical storage medium.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
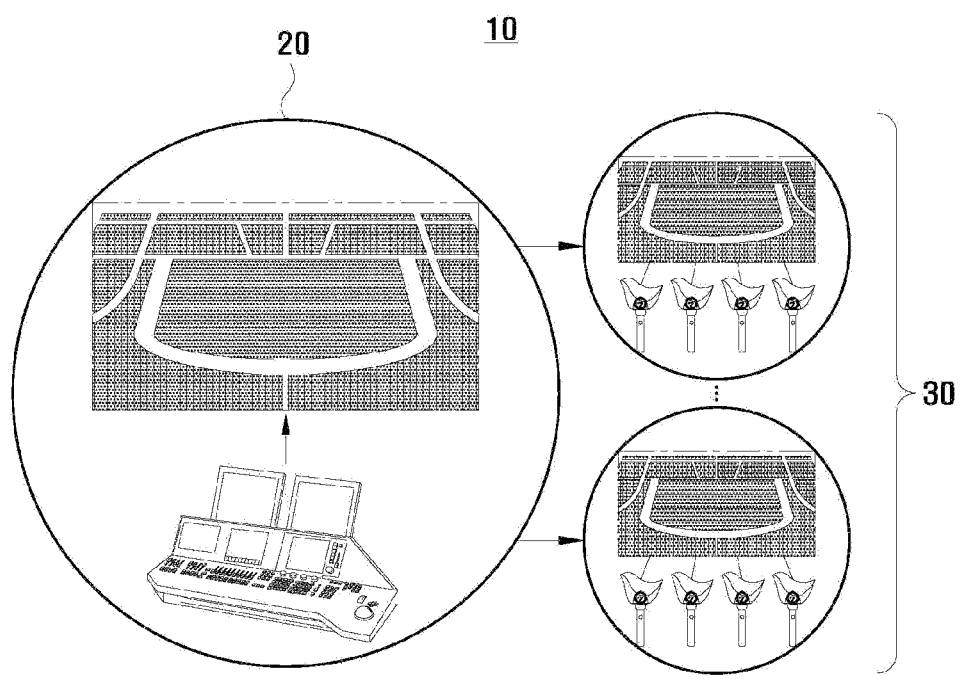
FIGS. 1 and 2 are diagrams schematically illustrating a configuration of a remote location directing system for simultaneously controlling to-be-controlled devices of spectators by linking a performance hall and a remote location according to an embodiment of the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein..

As used herein, the term "unit" or "module" refers to a hardware component such as software, FPGA, or ASIC, and "unit" or "module" performs certain roles. However, "~ unit" or "module" is not meant to be limited to software or hardware. "~ unit" or "~ module" may be configured to reside in an addressable storage medium or may be configured to reproduce one or more processors. Therefore, "~ unit" or "~ module" may include components such as software components, object-oriented software components, class components and task components, processes, functions, properties, procedures, sub-routines, segments of program codes, drivers, firmware, microcodes, circuitry, data, databases, data structures, tables, arrays, and variables. Components and functionality provided within "units" or "modules" may be combined into a smaller number of components and be further divided into additional components and "units" or "modules".

Hereinafter, embodiments of the inventive concept will be described in detail with reference to the accompanying drawings.

Figure 2:
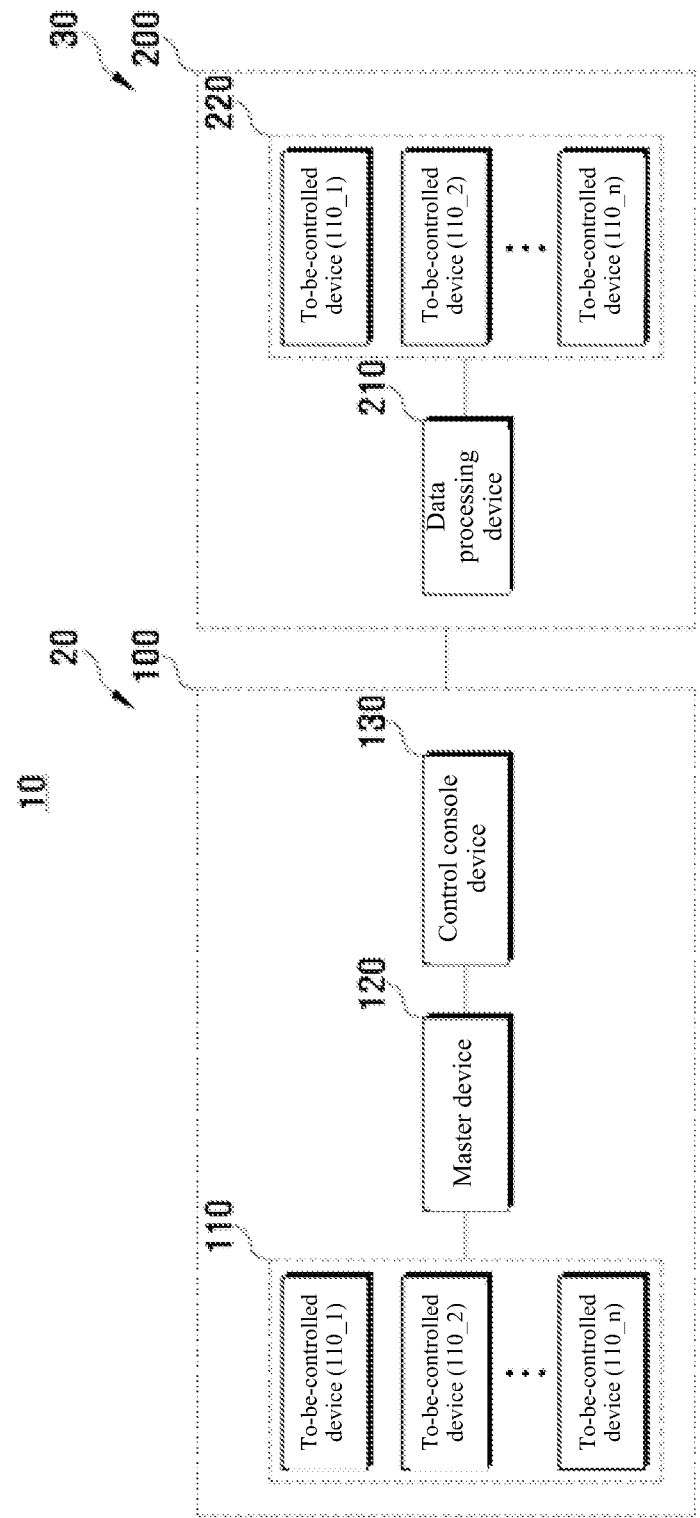

FIGS. 1 and 2 are diagrams schematically illustrating a configuration of a remote location directing system for simultaneously controlling to-be-controlled devices of spectators by linking a performance hall and a remote location according to an embodiment of the inventive concept.

Referring to FIGS. 1 and 2, a remote location directing system 10 according to an embodiment of the inventive concept may be configured to link a performance hall 20 and at least one remote location 30 and simultaneously control to-be-controlled devices 110 and 220 carried by spectators.

The performance hall 20 refers to a performance hall such as an athletic site or a concert hall, and may mean a place where performances such as an actual sports match or a concert are performed.

In the performance hall 20, the spectators for watching actual performance may enter the performance hall 20 with their to-be-controlled devices 110_1, . . . , 110_n, and take their respective seats in the performance hall 20.

The remote location 30 refers to a place other than the performance hall 20, and may be a place in which the same performance directing effect is implemented as the performance hall 20 in a place other than the performance hall 20 where the actual performance is being performed. For example, the remote location 30 may be a public place where a large number of people can gather, such as a theater, or a private space such as a house or a small space. In this case, it is preferable that the same performance data as the actual performance performed in the performance hall 20 is transmitted from the performance hall 20 to the remote location 30 in real time.

In some other embodiments, it is possible to identify the performance data of the performance hall 20 in the remote location 30 through physical storage media (not shown) such as not only various recording media including CD, DVD, HD-DVD, Blu-ray DISC or the like, but also various flash memory including SD (Secure Digital) memory card, memory stick, or MMC (Multi-Media Card) without being limited to streaming media transmitted in real time to make it possible to identify or watch relevant performance data in the remote location 30 through online video services such as YouTube.

Here, the performance data may mean one of live performance data, and the live performance data may include all types of data related to live performance, for example, one of video, audio, image, and text. Specifically, the performance data may include a live performance video, a live performance audio, a live performance image, a live performance text, and the like. Hereinafter, the content of the inventive concept will be described assuming that the live performance data is performance data, but the inventive concept is not limited thereto, and a configuration referred to as performance data may mean any form of live performance data.

In some other embodiments, the performance data may refer to data obtained by processing, editing or transforming any form of data related to a live performance to be a form suitable to be transmitted to the remote location 30. In some other embodiments, the performance data may include only video data for a live performance, and the performance data may include only audio data for a live performance In some other embodiments, the performance data may refer to content data including audiovisual content, for example, animations, movies, dramas, music videos, and other various types of images. As will be described later, it is possible to transmit control data synchronized with the performance data and a signal for enabling the transmitted control data to control a to-be-controlled device in synchronization with predetermined timing to control the to-be-controlled device possessed by a viewer during viewing of performance data, thus providing various effects that match the timing with the performance data or have a predetermined correspondence relationship. For example, in a case where the performance data includes animation content, when a special effect scene such as an explosion appears according to a development situation in the animation content, control data matching the explosion timing in the special effect scene of the performance data is transmitted to provide an interactive effect such as allowing a light emitting device to emit light or generating vibration in synchronization with the timing of the explosion, maximizing the effect of the to-be-controlled device.

In the remote location 30, the spectators who want to receive the same performance scene and performance directing effect as the actual performance performed in the performance hall 20 may have their own to-be-controlled devices 220_1, . . . , 220_n, respectively.

That is, the remote location directing system 10 according to the embodiment of the inventive concept may operatively link and simultaneously control the to-be-controlled devices 110 of the spectators in the performance hall 20 and the to-be-controlled devices 220 of the spectators in the remote location 30.

Specifically, the remote location directing system 10 may include a performance hall-side control system 100 including the to-be-controlled devices 110_1, . . . , 110_n (hereinafter, 110), a master device 120, and a control console device 130 in the area of the performance hall 20. In addition, the remote location directing system 10 may include a remote location-side control system 200 including a data processing device 210 and to-be-controlled devices 220_1, . . . , 220_n (hereinafter, 220) in the area of the remote location 30.

Here, for convenience of description, the performance hall-side control system 100 is referred to as the first control system 100, and the remote location-side control system 200 is referred to as the second control system 200. In addition, the to-be-controlled device 110 in the performance hall 20 is referred to as the first to-be-controlled device 110, and the to-be-controlled device 220 in the remote location 30 is referred to as the second to-be-controlled device 220.

As the control console device 130 controls a light emission state (e.g., light emission color, brightness value, blinking speed, etc.) of the first to-be-controlled device 110, the first control system 100 may implement various types of performance directing effects (e.g., specific characters, specific images, surfing, etc.) in the spectator seats of the performance hall 20.

As the control console device 130 controls the first to-be-controlled device 110, the second control system 200 may also control the second to-be-controlled device 220 in conjunction therewith. In one embodiment, the second control system 200 may implement various types of performance directing effects in the remote location 30 by controlling the light emission states of the second to-be-controlled devices 220 possessed by the spectators in the remote location 30 under the control of the control console device 130.

The first to-be-controlled device 110 may perform a function of producing various types of performance directing effects in real time by the control console device 130 or according to predetermined control information. In one embodiment, the first to-be-controlled device 110 is a device including a light source, and may be a small cheering tool used in a performance hall including, but is not limited to, an athletic stadium or a concert. In some other embodiments, the first to-be-controlled device 110 may include various functional elements, such as an element including light emitting devices such as LEDs to emit light by an external signal, an element that includes a vibration element to generate a predetermined vibration pattern, for example, a vibration pattern synchronized with a video or a vibration pattern for a special effect by an external signal, an element including a sound output module to generate a special effect sound synchronized with a video by an external signal, and an element including a power unit for mechanical driving, for example, a small actuator to control its movement by an external signal.

In some other embodiments, the to-be-controlled device 110 is a device including a small power output device including an actuator, such as a toy having a predetermined shape or an articulated doll, and may generate, with the control data, an interactive effect, for example, vibration in an explosion scene or light emission control, to match the video of the performance data being played by the to-be-controlled device 110.

The master device 120 may communicate with the first to-be-controlled device 110 in various ways to transmit a variety of control information received from the control console device 130 to the first to-be-controlled device 110.

In an embodiment, the master device 120 may receive control data generated by the control console device 130 and convert the control data into a wireless signal. In addition, the master device 120 may transmit the converted wireless signal to the first to-be-controlled device 110 in the performance hall 20 using wireless communication (e.g., RF communication). Here, the wireless signal may be generated by converting control data into a form for controlling the first to-be-controlled device 110 in a wireless communication method.

According to an embodiment, the master device 120 may be omitted, and the control console device 130 may directly transmit control data to the first to-be-controlled device 110 through wired or wireless communication.

In some other embodiments, the control data may be data in a form different from the performance data described above, and may include various types of control commands for controlling the to-be-controlled device in the remote location 30. The control data may include at least one of a signal for controlling the light emission of a light emitting element, such as an LED, included in a to-be-controlled device possessed by a spectator, as well as a signal for controlling the vibration or mechanical operation of the to-be-controlled device. In addition, a voice signal for controlling a sound output unit of the to-be-controlled device may be further included, but is not limited thereto.

The control console device 130 may perform a function of controlling the first to-be-controlled device 110 in order to implement various performance directing effects in the performance hall 20. At the same time, the control console device 130 may perform a function of controlling the second to-be-controlled device 220 in order to implement the same performance directing effect as that of the performance hall 20 even in the remote location 30, but is not limited thereto. For example, a device for controlling the first to-be-controlled device 110 at the performance site and a device for controlling the second to-be-controlled device 220 at the remote location 30 may be separated from each other. In this case, the device controlling the first to-be-controlled device 110 and the device controlling the second to-be-controlled device 220 may share the same control data and may employ a method in which a control device on one side transmits control data to a control device on the other side, or share a synchronization signal such as a time code or timestamp for synchronizing mutual timing.

In one embodiment, the control console device 130 may be an electronic device such as, but is not limited to, a smart phone, tablet, desktop PC, laptop PC, netbook computer, set-top box, PMP, IPTV receiver, broadcast receiver, or the like, but is not limited thereto, and may include a part of the configuration of the electronic device or may be configured in various forms capable of interworking with the electronic device.

In another embodiment, the control console device 130 is a control device used at the performance site, and may be a console device for broadcasting and performance that controls lighting devices, special effect devices, and the like at the performance site, for example, a wired or wireless control console such as GrandMA that controls the lighting of a concert hall. For example, the control console device 130 may be a console device for controlling various devices at the performance site using a protocol for controlling lighting. The control console device 130 may be a device configured alone with dedicated hardware, be operatively linked or may be in the form of a program installed and operated in a PC, such as a laptop or desktop, or workstation.

The control console device 130 may generate control data for controlling the first to-be-controlled device 110 in correspondence to the performance directing data based on the performance directing data generated to implement the performance directing effect by using the first to-be-controlled device 110 positioned to correspond to each seat in the performance hall 20.

In addition, the control console device 130 may control the first to-be-controlled device 110 and the second to-be-controlled device 220 together by providing the control data used to control the first to-be-controlled device 110 to the second to-be-controlled device 220 of the remote location 30.

The data processing device 210 may process performance data generated based on the performance performed in the performance hall 20 for spectators in the remote location 30 and control data generated by the control console device 130 together in order to implement the performance directing effect, which is implemented in the performance hall 20, in the remote location 30 through linking. That is, the data processing device 210 may simultaneously control the performance data and the control data to simultaneously control the second to-be-controlled device 220 of the spectator in the remote location 30 while providing the performance data to the remote location 30. By simultaneously controlling the performance data and the control data by the data processing device 210, it is possible to control the second to-be-controlled device 220 while preventing a playback error or playback delay that may occur during playback of the performance data.

The data processing device 210 may include devices that an individual may possess, such as, a smartphone, a tablet, a wearable device, a desktop PC, a laptop PC, a netbook computer, a head mounted display (HMD), and a personal digital assistant (PDA), a virtual reality (VR) device, a smart car or the like, which include an video playback function and a remote communication function, may include some of the components of the device or may be configured in various forms capable of interworking with the device.

For example, when the data processing device 210 includes a smartphone among devices, the data processing device 210 may analyze and identify the control data using an application program or application while playing the performance data through a screen of the smartphone, and transmit the control data to the to-be-controlled devices 220 of spectators in the remote location 30 in a wired/wireless communication method to control the to-be-controlled device 220. In this case, the application program (or application) may be downloaded through an external server or the performance hall-side control system 100 through wireless communication.

The data processing device 210 may control the second to-be-controlled devices 220 at the remote location 30 individually or simultaneously. For example, when the remote location 30 is a public place where a plurality of spectators are located, the plurality of data processing devices 210 may individually control the plurality of second to-be-controlled devices 220. On the other hand, when the remote location 30 is a public place where a plurality of spectators are located, a plurality of second to-be-controlled devices 220 may be simultaneously controlled using one data processing device 210. That is, the second to-be-controlled device 220 may be controlled by analyzing and identifying the control data while playing the performance data through a playback device (not shown) (e.g., beam projector, monitor, TV, etc.) connected to the data processing device 210. Accordingly, the spectators in the remote location 30 are able to experience the performance by using the second to-be-controlled device 220 accordingly while sharing performance data through the playback device.

In addition, when the remote location 30 is a place in a personal space, the data processing device 210 may individually control the to-be-controlled devices 220. In this case, the data processing device 210 may control the to-be-controlled device 220 by analyzing and identifying the control data while playing the performance data through the playback device.

Meanwhile, the control data is provided in synchronization with the performance data, and may be control data synchronized with the current playback section of the performance data.

In one embodiment, the control data synchronized with the performance data may be configured by mapping time code information to control data, to be synchronized with the performance data using time code information generated based on the performance data or time code information generated based on the performance of the performance hall 20. That is, the performance data of the remote location 30 and the second to-be-controlled device 220 of the remote location 30 may be synchronized with each other using the time code information. Accordingly, although it has been described that the time code information is generated based on the performance data or the performance of the performance hall 20 in the present disclosure, the present disclosure is not limited thereto. For example, the time code information mapped to the control data synchronized with a current playback section of the performance data may be generated by a sound source device, a camera device, or a media server at the performance site, a time code management/control generation apparatus, a media playback device, the master device 120, the control console device 130, the first to-be-controlled device 110, a synchronization device in a general editing room that manages or is in charge of transmission of performance data or a server 140 to be described later. In other words, since the time code information is included in control data corresponding to the performance data of the performance hall 20 to be transmitted to the remote location 30, the time code information may be shared and controlled by various devices located in the remote location 30, which are able to control the control data.

Furthermore, in order to solve the playback delay phenomenon caused by intentional delayed relay broadcasting or technical limitations of remote transmission from a remote location, the control data provided to the first to-be-controlled device 110 according to the performance data in the performance hall 20 is transmitted together or separately when the performance data is transmitted to the remote location 30 and in this case, the time code information is included in the control data, and the time code information included in the performance data is mapped to the control data when the performance data played at the remote location 30, thus synchronizing the control data of the second to-be-controlled device 220 with the performance data. Accordingly, the spectators in the remote location 30 may enjoy a more realistic performance because the performance data and the second to-be-controlled device 220 match each other. In addition, when the actual performance data is played back through physical storage media such as CD, DVD, HD-DVD, Blu-ray DISC, or the like, or corresponding performance data is played through online video providing services such as YouTube, the sense of immersion may be maximized by matching the performance data being played and the control data of the second to-be-controlled device 220 using time code information.

In this case, the data processing device 210 may extract control data mapped to the time code information corresponding to the current play section of the performance data from the control data synchronized with the performance data, and provide the control data to the second to-be-controlled device 220.

In addition, the data processing device 210 may receive the corresponding performance data and control data related to the performance data through an online video providing service such as YouTube.

In addition, the data processing device 210 may include a display device capable of outputting performance data.

On the other hand, the data processing device 210 may receive and process the performance data and the control data related to the performance data through a physical storage medium. For example, the data processing device 210 may receive performance data and control data related to the performance data through a physical storage medium including a variety of recording media such as CD, DVD, HD-DVD, and Blu-ray DISC, as well as various types of flash memory such as a Secure Digital (SD) memory card, a memory stick, or a Multi-Media Card (MMC). As described above, when performance data is identified at a remote location using a physical storage medium, the spectators at the remote location may have the same experience as watching a performance at a performance hall regardless of time and place.

The second to-be-controlled device 220 may perform a function of producing various types of performance directing effects by being controlled in real time or in synchronization with the first to-be-controlled device 110 that is controlled under the control of the control console device 130 based on the control data. In this case, the second to-be-controlled device 220 may be controlled based on the same control data as the first to-be-controlled device 110.

In one embodiment, the second to-be-controlled device 220 is a device including a light source, and may be a small cheering tool used in a performance hall such as an athletic stadium or a concert. Alternatively, the second to-be-controlled device 220 may utilize various smart devices capable of performing a function such as a small support tool.

In one embodiment, the second to-be-controlled device 220 may be controlled to correspond to the performance directing data based on the control data corresponding to the current play section of the performance data. In this case, the second to-be-controlled device 220 may receive control data from the data processing device 210. However, the inventive concept is not limited thereto, and the control data may be provided through another device connected to the second to-be-controlled device 220.

Also, the second to-be-controlled device 220 may be controlled based on control data in correspondence with at least one of the first to-be-controlled devices 110. Alternatively, the second to-be-controlled device 220 may be controlled based on the control data in correspondence with a virtual seat created virtually in the performance hall 20.

Hereinafter, a method for simultaneously controlling to-be-controlled devices of spectators by linking a performance hall and a remote location according to an embodiment of the inventive concept having such a structure and a remote location directing system 10 for performing the method will be described in more detail below. In this case, the remote location directing system 10 may link the performance hall 20 and at least one remote location 30 and simultaneously control to-be-controlled devices 110 and 220 which spectators possessed by the spectators, through the data processing device 210 that provides performance data and at the same time provides control data related to the performance data.

Figure 3:
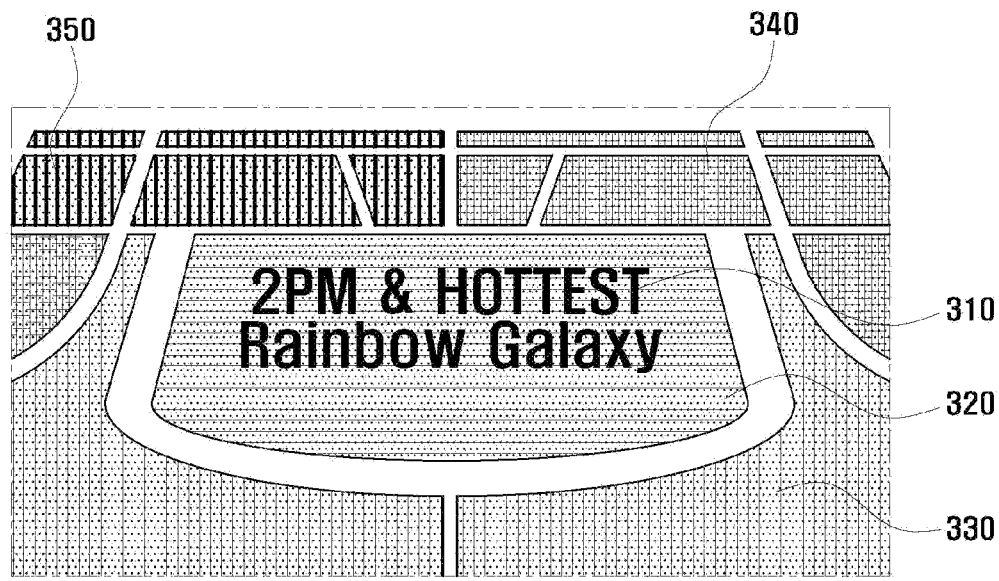
FIG. 3 is a view showing an example of a performance directing effect produced on the spectator seats of the performance hall according to an embodiment of the inventive concept.

FIG. 3 is a view showing an example of a performance directing effect produced on the spectator seats of the performance hall 20 according to an embodiment of the inventive concept.

The remote location directing system 10 may generate performance directing data to implement a performance directing effect by using the first to-be-controlled device 110 located to correspond to each seat in the performance hall 20.

In this case, the performance directing data may be generated in the control console device 130 or may be generated in a separate device (e.g., data generating device) and provided to the control console device 130. Hereinafter, for convenience of description, it will be described that a data generating device (not shown) generates performance directing data.

The data generating device may generate a directing scene to be produced by using the first to-be-controlled device 110 during the performance time performed in the performance hall 20, and in this case, configure the directing scene for each performance direction section according to the directing scene. For example, in a first performance direction section (e.g., a first time period), a first direction scene (e.g., a first scene) may be generated, and in the second performance direction section (e.g., a second time period), a second direction scene (e.g., a second scene) may be generated. As shown in FIG. 3, when the spectator seats in the performance hall 20 are configured, in the first performance direction section, a first direction scene in which different luminous colors shine for each seat of the spectator seats while a specific text is being created as in FIG. 3 may be generated. In addition, in the second performance direction section, a scene different from the first direction scene, for example, a second direction scene in which a specific figure and pattern is expressed, may be generated.

The data generating device may group the spectator seats of the performance hall 20 into a plurality of groups based on each direction scene generated for each performance direction section, and generate group information for each of the plurality of groups grouped. For example, when there are a plurality of group units that can be grouped in a light emission form similar to or identical to the first direction scene to be produced in the first performance direction section, the spectator seats of the performance hall are divided into a plurality of regions respectively corresponding to the group units and the each divided region may be created as a group. In other words, the first direction scene of the first performance direction section may include a plurality of groups.

Referring to FIG. 3, the seats in the spectator seats expressed with specific text are specified as a first group 310, and seats produced in the same luminous color are distinguished from each other in the spectator seats and specified as second to fifth groups 320, 330, 340, and 350, respectively.

The data generating device may map a plurality of group information respectively generated for performance direction sections (performance direction scene) to seat information in the spectator seat, and configure the mapped information as performance directing data for each performance direction section. For example, the data generating device may configure performance directing data by mapping a corresponding plurality of group information to direction information for each section as shown in Table 1 below. Here, the group information may mean group-specific control information for controlling the first to-be-controlled device 110 for each group in correspondence with each direction scene for each performance direction section. The group-specific control information may include group allocation information (that is, group identification information) and light emission state information set corresponding to the group allocation information. That is, the first to-be-controlled devices 110 having the same group allocation information for each performance direction section may include the same light emission state information. Also, the first to-be-controlled devices 110 having the same group allocation information may be different for each performance direction section. For example, the to-be-controlled device 110_1 having group allocation information A in the first performance direction section (first performance direction scene) may be set as group allocation information B in the second performance direction section (second performance direction scene). In other words, the to-be-controlled device 110 belonging to a group A in the first performance direction section (first performance direction scene) and the to-be-controlled device 110 belonging to the group A in the second performance direction section (the second performance direction scene) may be different from each other.

TABLE 1

| | | Directing information (e.g., scene information) | | | |
|---|---|---|---|---|---|
| | | First performance information | | Second performance information | ... |
| Group information | Light emission state information for each group | A<br>B<br>C<br>D<br>E | (255, 255, 0)<br>(154, 112, 55)<br>(0, 0, 255)<br>(0, 255, 255)<br>(100, 100, 100) | A<br>B<br>C | (0, 0, 0)<br>(255, 0, 0)<br>(0, 0, 255) |

The control console device 130 may control the first to-be-controlled device 110 located corresponding to each seat in the performance hall 20 using the performance directing data as described above, and generate control data for the control. In one embodiment, the control console device 130 may generate control data including light emission state information for each group mapped to a direction scene to be produced in a corresponding performance direction section based on performance directing data, and broadcast the generated control data through wireless communication. In this case, the control console device 130 may directly transmit the control data to the first to-be-controlled device 110 in the performance hall 20, or transmit the control data to the first to-be-controlled device 110 in the performance hall 20 through the master device 120. In addition, the control data may be transmitted through an antenna (not shown) for wireless transmission connected to the master device 120 by wire or wirelessly. In this case, as described above, the master device 120 may receive the control data generated by the control console device 130, and convert the received control data into a data format determined according to a communication method. Accordingly, the master device 120 may transmit the converted control data to the first to-be-controlled device 110 according to a specific communication method (e.g., wireless communication such as RF communication).

For example, in the process of performing a performance in a performance hall, when a first performance direction section (e.g., the first time period) is reached, the control console device 130 may obtain a plurality of group information mapped to a first direction scene in the first performance direction section (e.g., the first time period). According to Table 1, five groups (A, B, C, D, and E) are mapped to the first direction information, and a corresponding light emission state information (e.g., RGB information) is set to each group (A, B, C, D, and E). The control console device 130 may generate control data for five group information including each group mapped to the first performance section and light emission state information corresponding thereto.

In addition, the control console device 130 may provide the control data generated in correspondence with the performance directing data to the second to-be-controlled device 220 of the remote location 30, thereby implementing (a part of) a performance direction scene even in the remote location 30 as shown in FIG. 3 through interworking with the performance hall 20.

Meanwhile, the first and second to-be-controlled devices 110 and 220 may have the form of a cheering light stick or body-attached device that the spectators can possess and participate as a part of a performance produced. The first and second to-be-controlled devices 110 and 220 are mapped to the spectator seats on a one to one basis, and perform a role of allowing the spectator seats to display images, such as displays, electronic billboards or media façades in the dark or equivalent state of the performance hall.

In this case, the second to-be-controlled device 220 may be controlled in the same manner based on control data in correspondence with at least one of the first to-be-controlled devices 110. Alternatively, the second to-be-controlled device 220 may be controlled based on the control data in correspondence with a virtual seat created virtually in the performance hall 20.

In an embodiment, the first and second to-be-controlled devices 110 and 220 may include performance directing data using the first and second to-be-controlled devices 110 and 220 in the spectator seats in advance before performance directing is performed.

In another embodiment, the first and second to-be-controlled devices 110 and 220 may store only group information on which group each of the first and second to-be-controlled devices 110 and 220 belongs to for each scene in advance before performance directing is performed. In this case, the light emission state information (e.g., color information) may be excluded from pre-stored information. The group information may mean a bundle of to-be-controlled devices controlled with the same color at a specific moment or scene.

To this end, the first and second to-be-controlled devices 110 and 220 may maintain the allocated group-specific light emission state information (e.g., lighting color information) to be empty data, or record only dummy data or temporary color data. That is, the actual group-specific lighting color information may be transmitted in real time while performing an actual performance That is, group information may be allocated such that a plurality of to-be-controlled devices controlled together with the same color in a specific scene have the same group information, and information on which color the corresponding group is controlled with may be excluded. In the actual performance directing process, the color can be changed in consideration of the atmosphere or situation of the site, thus achieving flexible performance production unlike a method in which all color information is stored in a cheering device in advance.

Figure 4:
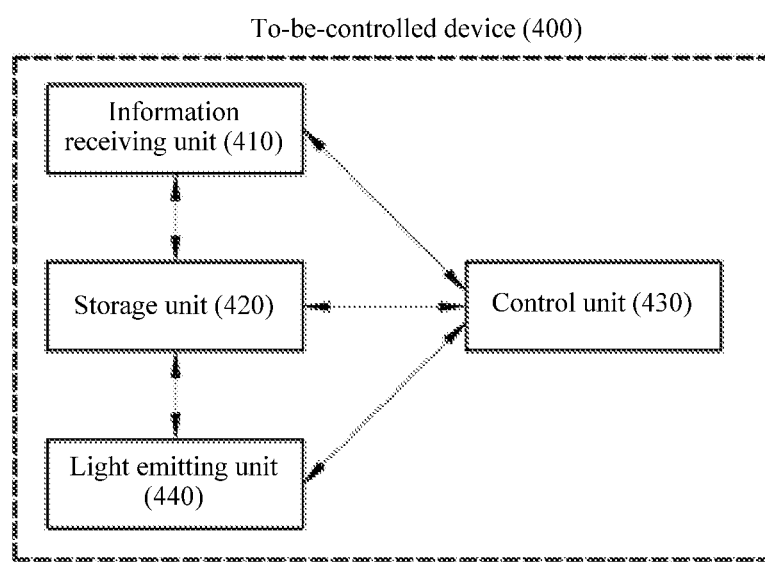
FIG. 4 is a diagram illustrating a configuration of a to-be-controlled device according to an embodiment of the inventive concept.

FIG. 4 is a diagram illustrating a configuration of a to-be-controlled device according to an embodiment of the inventive concept. A to-be-controlled device of FIG. 4 representatively shows the first to-be-controlled device 110 and the second to-be-controlled device 220.

Referring to FIG. 4, a to-be-controlled device 400 according to an embodiment of the inventive concept may include an information receiving unit 410, a storage unit 420, a control unit 430, and a light emitting unit 440.

The information receiving unit 410 may receive information in connection with another device. In one embodiment, the information receiving unit 410 may include a wired communication module or a wireless communication module, for example, may include an RF transmitter/receiver, ZigBee, Bluetooth, WIFI module, and the like.

The information receiving unit 410 may obtain group information for each performance directing section from a separate server or a separate device based on the performance directing data preset in spectator seat location information of the to-be-controlled device itself (corresponding to-be-controlled device).

In one embodiment, the information receiving unit 410 may receive group information mapped to its own spectator seat location information for each performance directing section, and configure group data as shown in Table 2 below.

TABLE 2

| | Directing information (e.g., scene information) | | | | |
|---|---|---|---|---|---|
| | 1 | 2 | 3 | 4 | 5 | ... |
| Group information | A | C | F | G | {15, 15} | ... |

Table 2 may be exemplary data of group information for each directing scene with respect to one specific to-be-controlled device 400. The present to-be-controlled device 400 belongs to group A in the first scene, and may be controlled in the same manner as other to-be-controlled devices belonging to group A. Also, when the scene is switched to the second scene, it may be controlled as group C.

As described above, in the process of recording group information in the to-be-controlled device 400 in advance, only information about the group is stored, and information on which light emission state (e.g., color) group A has may not be stored. Therefore, the control console device 130 may include light emission state information (e.g., color information) in control data to generate the control data, and then transmit the control data to all or some of the to-be-controlled devices 400 arranged in the site. For example, in the pre-producing and planning process, in the first scene, group A was defined as being controlled in red (255, 0, 0), but the control data modified such that group A is to be controlled in green (0, 255, 0), in consideration of the site atmosphere or interaction with the spectator, may be broadcast. In this case, since there is no change in the plurality of cheering light devices belonging to group A to be controlled in green, the distribution of the seats of the plurality of to-be-controlled devices belonging to group A and the outline of the shapes and patterns that they constitute are maintained as they are and only the color of the to-be-controlled devices belonging to group A may emit green light.

The storage unit 420 may include a memory, a cache, a buffer, or the like, and may store data received or generated from other components such as the to-be-controlled device 400, the master device 120, the control console device 130, or the data processing device 210. As an embodiment, the storage unit 420 may the spectator seat location information in the performance hall, received by the information receiving unit 410, and group data according to the spectator seat location information. Without being limited thereto, the storage unit 420 may be connected to a playable video file, and may store performance data of the performance hall 20 and control data according to the performance data, received through a physical storage medium.

As described above, the information receiving unit 410 may receive and store the spectator seat location information of the performance hall 20 and the group data according to the spectator seat location information from an external device. According to embodiments, when a spectator inputs performance ticket information through a PC or a smart device, and the information receiving unit 410 receives group data mapped to the input ticket information through a wired/wireless communication module and store the group information in the storage unit 420.

Also, the storage unit 420 may store a plurality of application programs (or applications) driven in the to-be-controlled device 400, and data and and commands for the operation of the to-be-controlled device 400. At least some of these application programs may be downloaded from an external server through wireless communication.

The control unit 430 may receive control data from the control console device 130, the master device 120, or the data processing device 210, and in this case, selectively receive control data corresponding to the group information of the to-be-controlled device 400. In one embodiment, the control unit 430 may selectively extract only the light emission state information corresponding to the group information of the to-be-controlled device 400 from the control data based on the group data according to the spectator seat location information, and perform control such that the light emitting unit 440 operates according to the extracted light emission state information.

The light emitting unit 440 may include one or more light source elements, and the light source element may use, for example, a light emitting diode (LED). In addition, the light emitting unit 440 may output light of various colors according to RGB color information by using the light source element.

Figure 5:
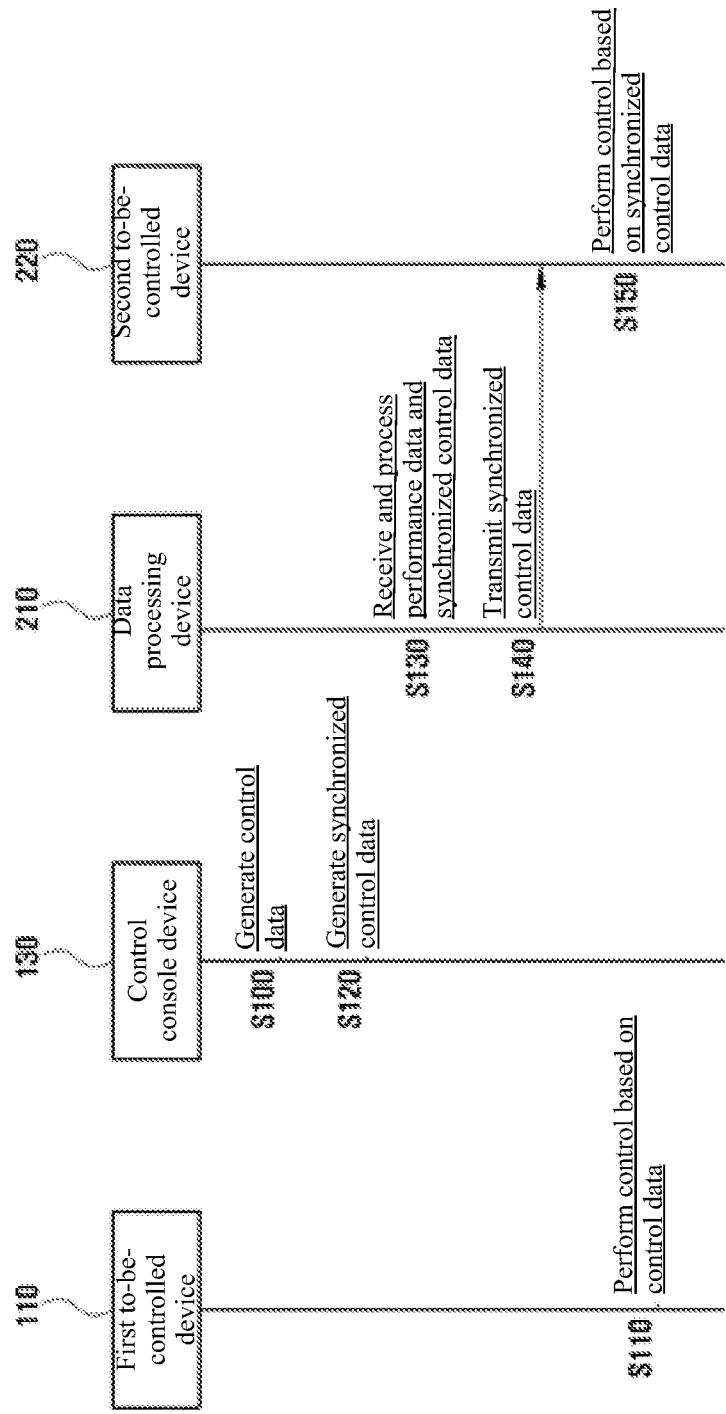
FIG. 5 is a flowchart illustrating a performance directing method for simultaneously controlling to-be-controlled devices of spectators by linking a performance hall and a remote location according to an embodiment of the inventive concept shown in FIG. 2.
Figure 6:
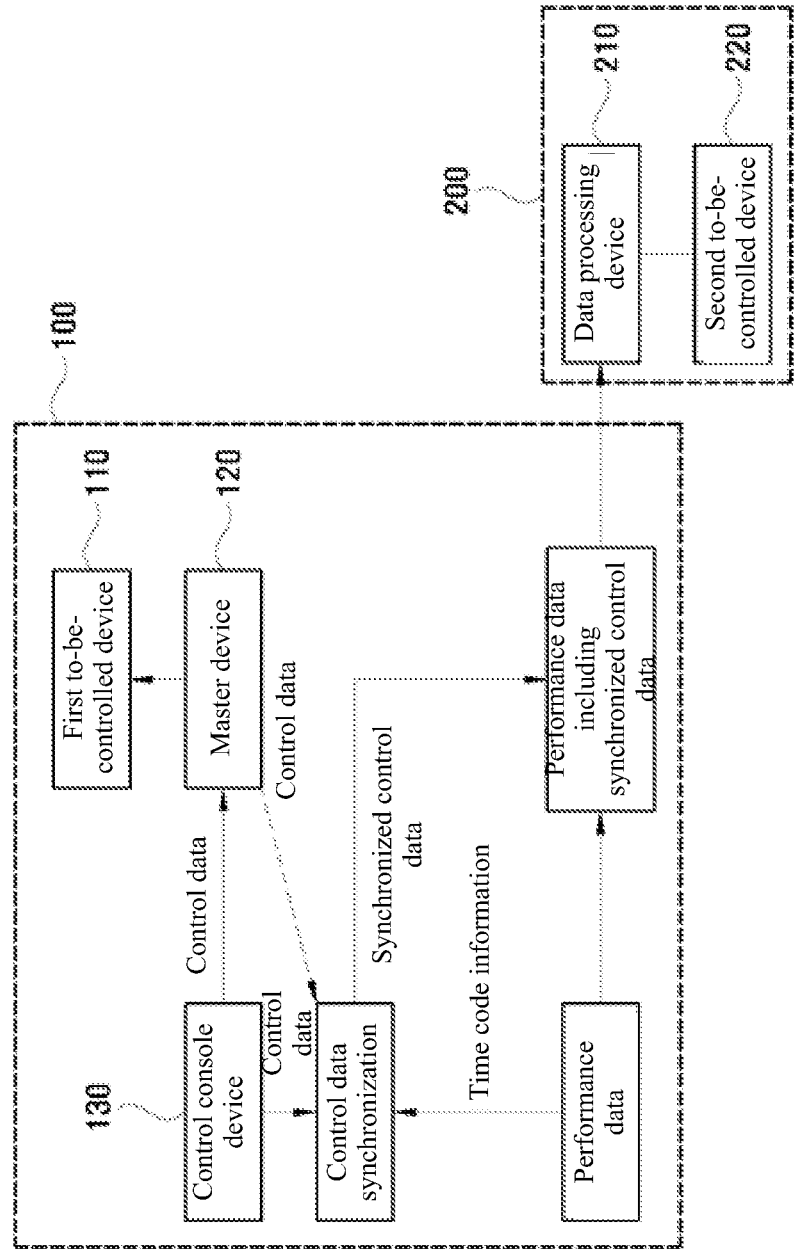
FIG. 6 is a diagram for describing an embodiment in which control data synchronized with performance data is included and provided according to an embodiment of the inventive concept.

The operation of the remote location directing system 10 for simultaneously controlling the to-be-controlled devices of spectators by linking a performance hall and a remote location according to an embodiment of the inventive concept having the structure described above will be described below. FIG. 5 is a flowchart illustrating a performance directing method for simultaneously controlling to-be-controlled devices of spectators by linking a performance hall and a remote location according to an embodiment of the inventive concept shown in FIG. 2, and FIG. 6 is a diagram for describing an embodiment in a case where control data synchronized with performance data is included and provided.

First, referring to FIG. 5, the control console device 130 may generate control data for controlling the first to-be-controlled device 110 in correspondence to the performance directing data based on the performance directing data generated to implement the performance directing effect by using the first to-be-controlled device 110 positioned to correspond to each seat in the performance hall 20 (S100).

In one embodiment, the control console device 130 may generate control data corresponding to the performance time as a performance is performed in the performance hall 20 based on the performance directing data set to implement each direction scene for each performance direction section.

In this case, the control console device 130 may receive and store performance directing data in advance from another device (e.g., the above-described data generating device), or may receive performance directing data through another storage medium or transmission medium. Also, the control console device 130 may receive the performance directing data in real time during the performance and generate control data corresponding to the performance directing data.

Next, the first to-be-controlled device 110 may receive control data from the control console device 130 or the master device 120. In this case, the first to-be-controlled device 110 may selectively receive control data corresponding to group information pre-stored in the first to-be-controlled device 110 and operate according to the light emission state (e.g., light emission color) corresponding to its own group information based on the received control data (S110).

As described above, the first to-be-controlled device 110 may be located corresponding to its own seat in the performance hall 20 specified through a performance ticket or the like, and receive and store group data including group information mapped to its seat in advance before the start of the performance According to an embodiment, the control console device 130 may directly transmit the control data to the first to-be-controlled device 110 in the performance hall 20 in a wireless communication method, or transmit the control data to the first to-be-controlled device 110 in the performance hall 20 through the master device 120. In this case, as described above, the master device 120 may receive the control data generated by the control console device 130, and convert the received control data into a data format determined according to a communication method. Accordingly, the master device 120 may transmit the converted control data to the first to-be-controlled device 110 according to a specific communication method (e.g., wireless communication such as RF communication).

Next, the control console device 130 may generate control data synchronized with the performance data (S120). That is, the control console device 130 may provide the control data to the first to-be-controlled device 110 in the performance hall 20, and at the same time, control the second to-be-controlled device 220 located at the remote location 30 by interworking with the performance hall 20.

Accordingly, the performance directing effect (that is, the performance direction scene) implemented in the performance hall 20 may be implemented to be synchronized in real time through interworking with the remote location 30. Accordingly, the control console device 130 may need to provide, to the remote location 30, the control data generated in step S100 to control the first to-be-controlled device 110 based on the performance directing data and implement performance directing effect in the spectator seats of the performance hall 20.

In addition, the spectators at the remote location 30 are able to experience the same performance directing effect as the performance hall 20 while watching performance data generated by filming the performance performed in the performance hall 20 or generated based on the performance To this end, the spectators at the remote location 30 can experience the performance directing effect according to the performance directing data together with the first to-be-controlled device 110 by carrying the second to-be-controlled device 220.

Accordingly, the control console device 130 may process the control data so as to synchronize the second to-be-controlled device 220 with the first to-be-controlled device 110 through interworking based on the control data generated to control the first to-be-controlled device 110.

In one embodiment, the control console device 130 may process the control data generated in step S100 to be synchronized with the performance data provided to the remote location 30. In this case, when control data and performance data are transmitted to the remote location 30, the control data and the performance data may not match each other due to technical problems or various problems of the remote location 30 during transmission, so that there may be a need for a process of synchronizing the control data with the performance data and performing control. To solve this, time code information may be added to synchronize the playback timing of the control data and the performance data. That is, the control console device may map time code information to control data, to be synchronized with the performance data using time code information generated based on the performance data or time code information generated based on the performance of the performance hall 20. In this case, the time code information is information mapped to the synchronized control data corresponding to a current reproduction section of the performance data, and may be generated by the master device 120, the control console device 130, the first to-be-controlled device 110, the server 140 to be described later or the like. The generated time code is provided to related devices, apparatuses, software or programs, so that all devices and apparatuses in the system can share the same time code information.

For example, the control console device 130 may map the control data to the time code information for each frame in the performance data using the time code information generated based on the playback time of the performance data to generate control data synchronized with the performance data.

Alternatively, the control console device 130 may map the control data to the time code information according to the performance time using the time code information generated based on the start time of the performance of the performance hall 20 to generate control data synchronized with performance data.

Here, the time code information may be time information generated in units of hours, minutes, seconds, milliseconds, frames, and the like. In the case of an image file, the playback time itself may be used as a time code, or the time code may be generated using a time code generator.

For example, the control console device 130 may map a start time point at which a to-be-controlled device performs a specific control operation according to the control data to the time code information based on time code information including time information generated in units of hours, minutes, seconds, milliseconds, frames, or the like to generate synchronized control data.

The time code information may be transformed into a form suitable for synchronization to a device at a remote location and then applied. In an embodiment, the time code information in hours, minutes, seconds, milliseconds or frames may be transformed into the form of hours, minutes, seconds, and milliseconds suitable for synchronization with a media playback device and stored or may be interpreted in a transformed form. In the case of the drop frame format used for the purpose of accuracy of time expression among the time code information formats, the appropriate milliseconds can be calculated and applied to a frame of the current time code through a calibration algorithm.

According to an embodiment, another device (e.g., synchronization device), not the control console device 130 may generate the control data synchronized with performance data so as to synchronize the second to-be-controlled device 220 with the first to-be-controlled device 110 through interworking based on the control data generated to control the first to-be-controlled device 110 as described above.

On the other hand, in general, at the performance site, it is possible to control various lighting devices directly or indirectly by converting lighting data into a general network signal and transmitting the network signal to a lighting control console device using control protocols such as DMX, ART-NET, ETC-NET, sACN, Shownet, KiNet supported by the lighting control console device, such as GRANDMA, Chamsys, Chroma Vista, High End Systems Hog, Avolites, Obsidian Onyx, MADRIX, or the like. In this case, the control data of the console device converted using the control protocol may be unidirectional and have no feedback, and in particular, may have a structure that does not include a synchronization signal such as a time code.

Therefore, when an existing console device is used at a performance site, as in the inventive concept, it is hard to control the second to-be-controlled device 220 of the remote location 30 while at the same time, interworking with the first to-be-controlled device 110 of the performance hall 20 using the control data generated to implement the performance directing effect in the performance hall 20.

However, in the inventive concept, as described above, the control console device 130 is able to synchronize and control the second to-be-controlled device 220 of the remote location 30 by interworking with the first to-be-controlled device 110 simultaneously through a process of mapping the time code information to the control data generated by controlling the first to-be-controlled device 110 in the performance hall 20. Therefore, when the control console device 130 of the inventive concept is used, it is possible to control the first to-be-controlled device 110 of the performance hall 20, and at the same time, map the control data to time code information to generate synchronized control data by using the existing GRANDMA console device as it is, thus controlling the second to-be-controlled device 220 of the remote location 30 together.

Next, the data processing device 210 may receive and identify the performance data and control data synchronized with the performance data (S130). That is, the data processing device 210 may receive and process the performance data and control data synchronized the performance data.

Specifically, referring to FIG. 6, when control data synchronized with the performance data is included in the form of video, audio, image, text, caption, and media information metadata, the data processing device 210 may extract the synchronized control data included in the performance data and extract control data mapped to time code information corresponding to a current playback section of the performance data from the extracted synchronized control data. In this case, although it is shown that the time code information is generated based on the performance data, the time code information is not limited thereto, and the time code information may be shared and generated by the master device 120, the control console device 130, or the first to-be-controlled device 110.

In one embodiment, the data processing device 210 may receive and process performance data and control data synchronized with the performance data from the performance hall 20 (that is, the first control system 100) in real time or at a predetermined time interval.

In another embodiment, the data processing device 210 may receive the performance data of the performance hall 20 and control data synchronized with the performance data through a physical storage medium. By receiving the performance data through the physical storage medium, the spectators in the remote location 30 may not be affected by time and place. In this case, the synchronized control data may be included in the performance data and provided, or control data synchronized with the performance data may be provided separately from the performance data.

When the performance data and control data are transmitted to the data processing device 210 of the remote location 30, the control data may be added to an empty storage space of multi-channel track information included in the performance data. Alternatively, the control data is added to a separate area distinguished by the subtitle data of the performance data, or the control data is added to a part of the frame or part of the pixel of the performance data through encryption or a predetermined conversion or hiding process, so that the control data may be combined with the performance data and then transmitted as one unit. Alternatively, the control data may be added to the metadata or some packets of the performance data and included in the performance data.

The control data may be added to the area in which some pixels of the screen area where the broadcaster of the performance data and the broadcast transmission title logo are arranged in a color interlocking with a cheering light stick, or after generating the light stick logo for controlling the cheering light stick. The control data may be added to and included in the non-recognized area corresponding to the outer portion of the video area, such as the location of the reference coordinates (0, 0) of the live video included in the performance data. In order to prevent interference with immersion in video watching during playback, a method may be applied, in which control information is not visualized on the video playback screen by performing shifting or magnification and covering the components of the playback device and the frame or playback time indicator. The control data may be included in the way of metadata of performance data, subtitle data, muted voice track, or the like.

Next, in order to implement the performance directing effect, which is being implemented in the performance hall 20, in the remote location 30 through interworking, the data processing device 210 may provide performance data to spectators at the remote location 30, and also the control data synchronized with the performance data to the second to-be-controlled device 220 through a wired/wireless communication method (S140). In this case, the data processing device 210 may be a device including a video playback function and a remote communication function.

Finally, the second to-be-controlled device 220 may be controlled to correspond to the performance directing data based on the control data corresponding to the current playback section of the performance video (S150).

In an embodiment, the second to-be-controlled device 220 may selectively receive control data corresponding to group information pre-stored in the second to-be-controlled device 220 based on the control data corresponding to the current playback section of the performance video and operate according to the light emission state (e.g., light emission color) corresponding to its own group information based on the received control data.

That is, since the second to-be-controlled device 220 receives the control data corresponding to the performance data at a current playback time point, the second to-be-controlled device 220 may operate in precise synchronization with the performance directing effect (that is, performance directing data) being produced by the first to-be-controlled device 110 in the performance data. Accordingly, the same performance and performance directing effects as being experienced in the performance hall 20 may be provided at the remote location 30.

The second to-be-controlled device 220 may be connected to the data processing device 210 through Bluetooth, wifi, a wired connection, a dongle device, or the like to receive control data synchronized with the performance data together, or may receive the control data synchronized with the performance data together through a separate device (e.g., separate server) or a separate transmission medium.

Figure 7:
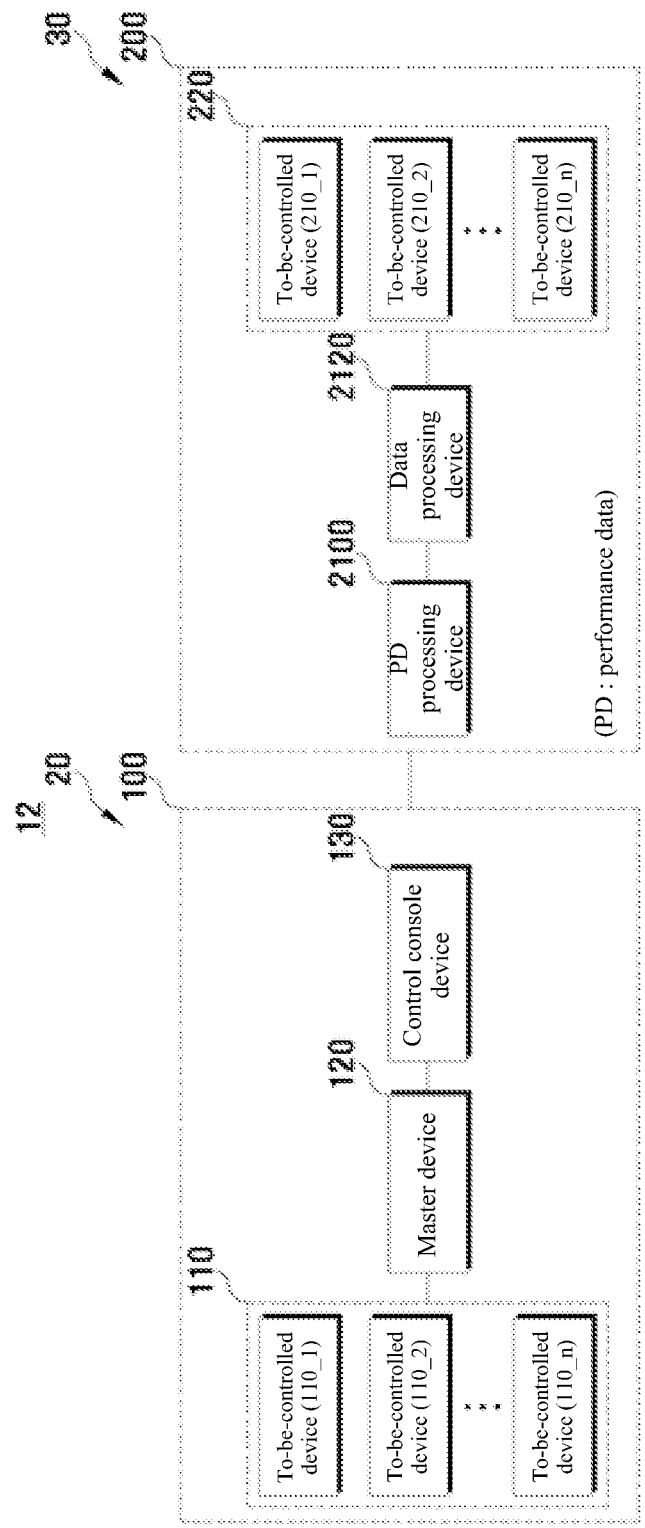
FIG. 7 is a diagram schematically illustrating a configuration of a remote location directing system for simultaneously controlling to-be-controlled devices 110 of spectators by linking a performance hall and a remote location according to another embodiment of the inventive concept.

FIG. 7 is a diagram schematically illustrating a configuration of a remote location directing system 12 for simultaneously controlling to-be-controlled devices of spectators by linking a performance hall and a remote location according to another embodiment of the inventive concept.

Referring to FIG. 7, the remote location directing system 12 according to another embodiment of the inventive concept may include a performance data processing device 2100 for processing performance data and a control data processing device 2120 for controlling the second to-be-controlled device 220 based on control data.

The remote location directing system 12 may have the same characteristics as the remote location directing system 10 shown in FIG. 2, except for the performance data processing device 2100 and the control data processing device 2120 shown in FIG. 7.

Hereinafter a detailed description of the content overlapping with the content described in FIG. 2 may be omitted in the description related to FIG. 7, and other features may be mainly described. Accordingly, the same reference numerals as in FIG. 2 are given to components performing the same function as the remote location directing system 12 shown in FIG. 7, and detailed description thereof will be omitted.

The performance data processing device 2100 may receive and process performance data. That is, the performance data processing device 2100 may provide the included performance data, which is one of video, audio, image, text, caption, media information, and metadata, to spectators in the remote location 30. The metadata may be configured in the form of subtitle data or in a separate format such as XML, but is not limited thereto.

The control data processing device 2120 may receive and process the control data synchronized with the performance data and provide the control data to the second to-be-controlled device 220. That is, the control data processing device 2120 may analyze and identify the control data and transmit the control data to the second to-be-controlled devices 220 of the spectators in the remote location 30 in a wired/wireless communication method for control. In this case, the control data processing device 2120 may analyze and identify the control data using an application program or application, and transmit the control data to the second to-be-controlled devices 220 of the spectators in the remote location 30 in a wired/wireless communication method for control and the application program or application may be downloaded from an external server or the performance hall-side control system 100 via wireless communication.

On the other hand, when the performance data and the control data synchronized with the performance data are not separated and provided through the data processing device 210 shown in FIG. 2, the performance data may be processed by the performance data processing device 2100 and the control data synchronized with the performance data may be separated and processed by the control data processing device 2120.

In one embodiment, after receiving the performance data and the control data synchronized with the performance data, the performance data processing device 2100 may separate and process the performance data and the control data and transmit the control data to the control data processing device 2120.

In an embodiment, the performance data processing device 2100 may be a playback device including a beam projector, a monitor, a TV, and the like.

In an embodiment, the control data processing device 2120 may be a device including a remote communication function.

Figure 8:
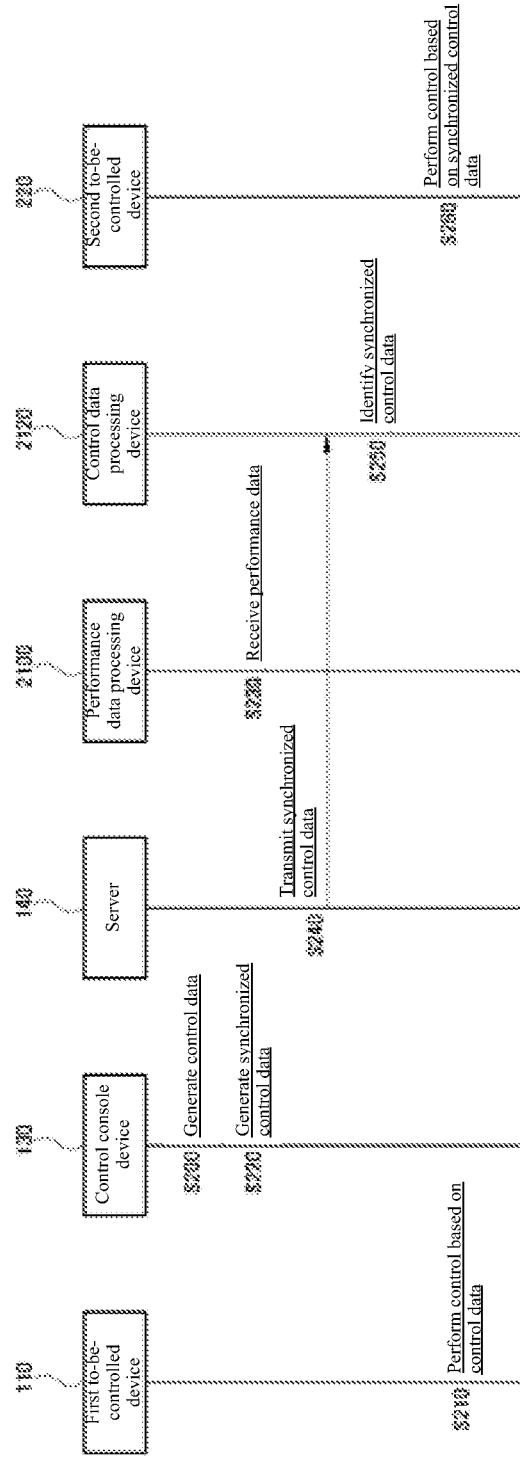
FIG. 8 is a flowchart illustrating a performance directing method for simultaneously controlling to-be-controlled devices of spectators by linking a performance hall and a remote location according to another embodiment of the inventive concept shown in FIG. 7.

The operation of the remote location directing system 12 for simultaneously controlling the to-be-controlled devices of spectators by linking the performance hall and the remote location according to another embodiment of the inventive concept having the structure as described above will be described below. FIG. 8 is a flowchart illustrating a performance directing method for simultaneously controlling to-be-controlled devices of spectators by linking a performance hall and a remote location according to another embodiment of the inventive concept shown in FIG. 7, and FIG. 9 is a diagram for describing an embodiment in a case where control data synchronized with performance data is separately provided.

In the present embodiment, the case where the control data synchronized with the performance data is provided separately will be described. Accordingly, step S200 may be the same as step S100 illustrated in FIG. 5, step S210 may be the same as step S110 illustrated in FIG. 5, and step S220 may be the same as step S120 illustrated in FIG. 5, so a detailed description thereof will be omitted.

Figure 9:
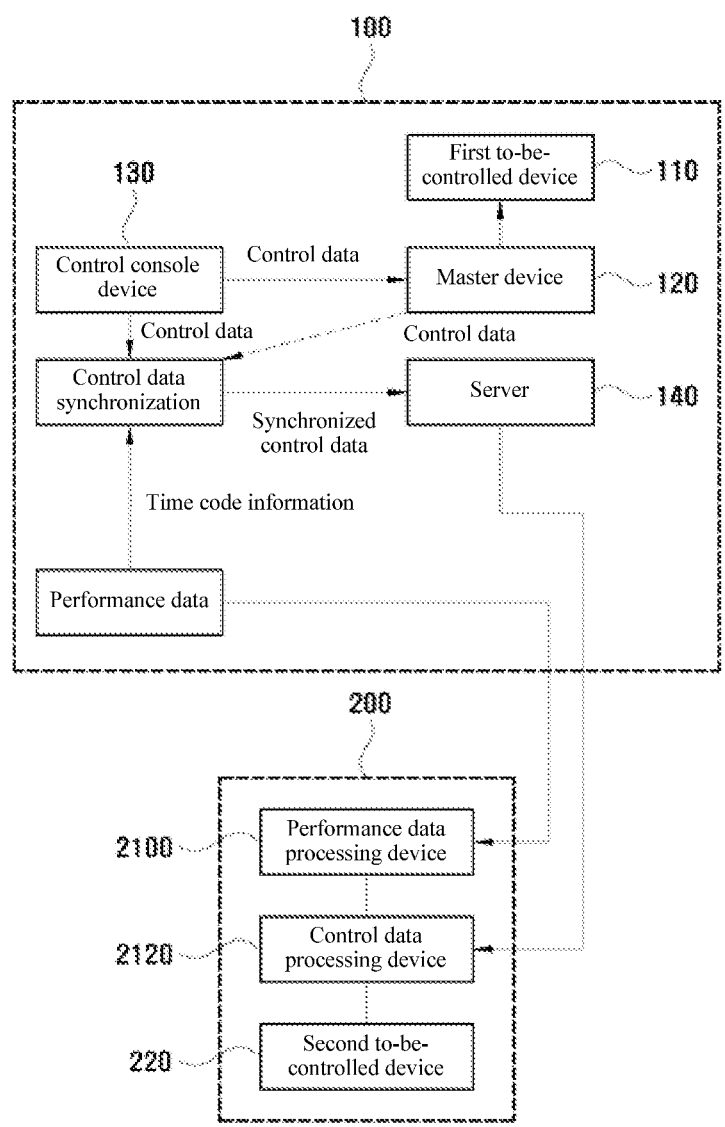
FIG. 9 is a diagram for describing an embodiment in a case where control data synchronized with performance data is separated and provided.

First, referring to FIGS. 8 and 9, when the performance data does not include synchronized control data, the performance data processing device 2100 may receive the performance data generated based on the performance performed in the performance hall 20 (S230). In this case, the performance data may be received from the performance hall 20 (that is, the first control system 100) in real time or at a predetermined time interval, or may be provided through a physical storage medium.

Next, when the performance data does not include synchronized control data, the server 140 may transmit the synchronized control data received from the control console device 130 to the control data processing device 2120 (S240).

Meanwhile, in the present embodiment, step S240 may be performed before or simultaneously with step S230.

Next, the control data processing device 2120 may identify the synchronized control data received from the server 140 (S250).

Specifically, the control data processing device 2120 may obtain the control data generated in correspondence with the performance data from the server 140, and extract the control data mapped to time code information corresponding to a current playback section of the performance data from the obtained control data. In this case, although the time code information is described as being generated based on the performance data, the time code information is not limited thereto, and the time code information may be shared and generated by the master device 120, the control console device 130, the first to-be-controlled device 110 or the server 140.

Finally, the second to-be-controlled device 220 may be controlled to correspond to the performance directing data based on the control data corresponding to the current playback section of the performance data (S260).

Figure 10:
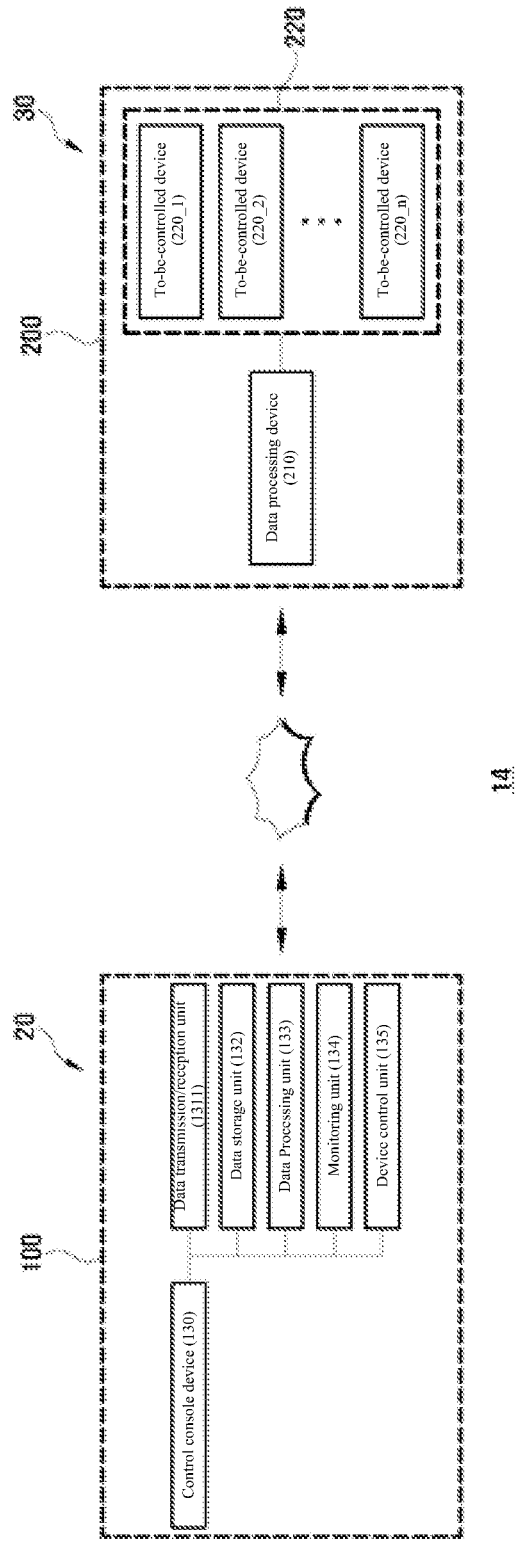
FIG. 10 is a diagram schematically illustrating a configuration of a remote location directing system for controlling to-be-controlled devices of spectators at a remote location in correspondence with a non-audience performance according to another embodiment of the inventive concept.

FIG. 10 is a diagram schematically illustrating a configuration of a remote location directing system for controlling to-be-controlled devices of spectators at a remote location in correspondence with a non-audience performance according to another embodiment of the inventive concept.

Referring to FIG. 10, a remote location directing system 14 according to another embodiment of the inventive concept may include the performance hall-side control system 100 that generates non-audience performance data corresponding to the non-audience performance performed in the area of the performance hall 20 and the remote location-side control system 200 that controls to-be-controlled devices 220_1, ..., and 220_n (hereinafter referred to as second to-be-controlled devices) in correspondence with the non-audience performance data in the remote location 30.

In the present embodiment, the non-audience performance performed in the area of the performance hall 20 may be a non-audience performance performed virtually without spectators for the safety of the spectators due to social or physical problems, but is not limited thereto. Even in the case of a performance for security or filming purposes, filming is performed in a state where there is no spectator, but the filmed performance data and/or control data may be transmitted to the outside or transferred to a spectator at the remote location 30 through a physical medium.

According to some other embodiments, when there is no on-site spectator during a performance, video recording, or broadcasting process, independent remote control data is transmitted to a to-be-controlled device at a remote location, so that a predetermined directing effect may be generated through the to-be-controlled device which is controlled in correspondence with a video or content being watched by a spectator at the remote location. It is noted that, as described above, the performance data operating at the same timing as the to-be-controlled device operating according to the control data is not limited to the non-audience performance data. For example, when there is a spectator in the site and the spectator in the site possesses a to-be-controlled device, a predetermined spectator directing scene can be realized by on-site control data in the site, and remote control data corresponding to the on-site control data is transmitted to a to-be-controlled device at a remote location, so that consistent control of lighting devices is achieved through timing control in which the to-be-controlled device in the site matches the to-be-controlled device in the remote location.

The performance hall-side control system 100 may include the control console device 130 that generates non-audience performance data based on a non-audience performance performed in the performance hall 20 and transmits the generated non-audience performance data to the remote location 30.

Specifically, the control console device 130 may include a data transmission/reception unit 131, a data storage unit 132, a data processing unit 133, a monitoring unit 134, and a device control unit 135.

The data transmission/reception unit 131 may receive performance data from a non-audience performance performed in the performance hall 20. Here, the performance data is data performed in the performance hall 20, and may be performance data including sound, movement, and spatial state generated when performance is being made on a stage.

The data transmission/reception unit 131 may transmit the non-audience performance data to the remote location-side control system 200. Here, the non-audience performance data may be data for implementing the performance directing effect by synchronizing the performance data with the control data for controlling the second to-be-controlled device 220 at the remote location 30 in correspondence with the performance data based on the non-audience performance data.

According to an embodiment, the data transmission/reception unit 131 may receive the non-audience performance data and transmit the performance data in the form of an internal signal for playback through its own display device for visually playing the performance data including a video, or transmit the performance data to a separate external playback apparatus or device.

In addition, the control data may be data capable of controlling the second to-be-controlled device 220 of the remote location-side control system 200 in correspondence with the performance data performed in the performance hall 20 in order to represent the performance directing effect in correspondence with the seats in the performance hall 20.

According to an embodiment, the control data may be data capable of controlling the second to-be-controlled device 220 of the remote location-side control system 200 in correspondence with the performance data performed in the performance hall 20 in order to represent the performance directing effect in correspondence with the virtual seats in the performance hall 20.

The non-audience performance directing data may include control data that is data generated to implement a performance directing effect using the second to-be-controlled device 220 located in the remote location 30 in correspondence with the performance data being made in the performance hall 20, but is not limited thereto, and the control data may be transmitted to the remote location 30 separately from the performance data.

According to an embodiment, the data transmission/reception unit 131 may transmit non-audience performance data to an external server.

According to an embodiment, the data transmission/reception unit 131 may receive a signal requesting watching of non-audience performance from the remote location-side control system 200.

The data storage unit 132 may store data transmitted/received between the performance hall-side control system 100 and the remote location-side control system 200 and data supporting various functions of the performance hall-side control system 100.

The data storage unit 132 may store a plurality of application programs (or applications) driven in the performance hall-side control system 100, and data and commands for the operation of the performance hall-side control system 100. At least some of these application programs may be downloaded from an external server through wireless communication.

According to an embodiment, the data storage unit 132 may store non-audience directing performance data, performance data, and control data. Here, the performance data and the control data may be data before being synchronized with each other on the basis of the non-audience directing performance data and being generated as non-audience performance data.

According to an embodiment, the data storage unit 132 may store the non-audience performance directing data.

The data processing unit 133 may perform conversion on the performance data and the control data such that non-audience performance data is able to be transmitted and received to the remote location-side control system 200.

For example, the data processing unit 133 may convert control data including control signals of lighting data into general network signals using control protocols such as DMX512, RDM, ART-NET, ETC-NET, sACN, Shownet, and KiNet supported by the control console device 130 such as GRANDMA, Chamsys, MADRIX, or the like located inside the performance hall 20.

According to some other embodiments, the performance data and the control data received at a remote location may be received through separate channels. To this end, a server for transmitting performance data or a storage medium supporting playback is separately separated, and a separate server that provides the control data to the remote location may be provided. Through this, when the performance data is received by a predetermined device or apparatus in a remote location, the timing of the control data may be synchronized based on reference information in the performance data, whereas, when the control data is received by a predetermined device or apparatus in the remote location, playback timing or playback section information of the performance data is synchronized based on reference information in the control data to be provided to a to-be-controlled device to match the control data and the timing. For example, the reference information may be in the form of a predetermined timestamp or time code information, and may be playback time information of performance data to be played, a frame number of an image, and information obtained by calibrating or converting the frame number of an image to a time, but is not limited thereto, and may include any form of information for matching the operations of performance data and control data.

The monitoring unit 134 may monitor data transmitted/received between the performance hall-side control system 100 and the remote location-side control system 200 through a screen. By identifying non-audience performance data generated by the performance hall-side control system 100 in real time by a manager, it is possible to provide more accurate non-audience performance data without errors.

The device control unit 135 may generate non-audience performance data by synchronizing the performance data with the control data corresponding to the performance data based on the non-audience performance directing data.

For example, the device control unit 135 may generate the non-audience performance by synchronizing performance data with control data corresponding to the performance data using a Digital Audio Workstation (DAW) device (not shown).

Specifically, the DAW device may convert the performance data received from the performance hall 20 into a MIDI signal, mute the remaining tracks except for the corresponding track for each MR sound source track, instrument track, singer-specific microphone track, and site sound track to tune the corresponding track, merge the tracks into a track of the post-production system (DAW Tools), and synchronize the track with control data to generate non-audience performance data. Accordingly, the remote location-side control system 200 that has received the non-audience performance data may enable spectators to watch a video or images in which the video and audio or images and audio included in the non-audience performance data are matched to each other without separation.

According to an embodiment, the device control unit 135 may provide, to the remote location-side control system 200, the non-audience performance data in real time, the non-audience performance data being generated by synchronizing the performance data received live with the control data in real time.

According to some other embodiments, the performance data and the control data may be transmitted in a state where there is no spectator in the site where a performance, filming, or real-time broadcast transmission is performed. Since there is no to-be controlled device in the site, the control data is not transmitted wirelessly from the site, and the control data is combined with or added to the performance data generated through relay, filming, or editing at the same time or afterwards. When the performance data and the control data are merged and transmitted together, the control data may be added to an empty storage space of multi-channel track information included in the performance data. Alternatively, the control data is added to a separate area distinguished by the subtitle data of the performance data, or the control data is added to a part of the frame or part of the pixel of the performance data through encryption or a predetermined conversion or hiding process, so that the control data may be combined with the performance data and then transmitted as one unit. Alternatively, the control data may be added to the metadata or some packets of the performance data and included in the performance data. The control data may be added to a corresponding area after some pixels of a portion where the broadcaster and the broadcast transmission title logo of the performance data are arranged, are added in a color interworking with a cheering light stick, or the cheering light stick logo for controlling the cheering light stick is generated. The control data may be added to and included in an area corresponding to the outer portion of an image, such as the coordinates (0, 0) of the performance data. In order to prevent interference with immersion in video watching during playback, a method may be applied, in which control information is not visualized on the video playback screen by performing shifting or magnification and covering the components of the playback device and the frame or playback time indicator. It may be included in a method using metadata, subtitle data, muted voice track, and the like.

In some other embodiments, when the formats of reference information between the playback time information of a device or apparatus for playing received or stored performance data and a control program of a device or apparatus for processing control data do not match each other, synchronization necessary for the playback of the performance data and the transmission of the control data may be performed by calculating a correction value through a predetermined operation.

Here, the device control unit 135 may generate non-audience performance data by synchronizing performance data performed live with control data in real time based on the non-audience performance directing data to provide the non-audience performance data to the remote location-side control system 200 in real time.

Alternatively, the device control unit 135 may generate non-audience performance data by synchronizing the performance data performed live with the control data to be spaced apart from each other at a predetermined time interval based on the non-audience performance directing data.

According to an embodiment, the device control unit 135 may synchronize the performance data and the control data corresponding to the performance data to be apart from each other at a predetermined time interval to generate the non-audience performance data.

According to an embodiment, the device control unit 135 may provide the non-audience performance data generated by synchronizing the recorded performance data with the control data to the remote location-side control system 200.

According to an embodiment, the device control unit 135 may convert the synchronized non-audience performance data into streaming data and provide the streaming data to the remote location-side control system 200.

For example, the device control unit 135 may provide actual non-audience performance data through an online video providing service such as vlive and YouTube such that the remote location-side control system 200 is able to identify the non-audience performance data.

According to some other embodiments, even when there is no audience at the site where performance, filming, or real-time broadcast transmission is performed, the control data may be directly received from a master device placed in the site which generates control data while generating performance data at the same time by a wired or wireless manner and then transmitted together with the performance data. A method of transmitting performance data and control data together may be used, and the control data may be transmitted to a to-be-controlled device at a remote location through a separate server that receives the control data directly through the master device in the site and provides control data separately from the performance data.

According to an embodiment, the device control unit 135 may record synchronized non-audience performance data in a physical storage medium (not shown) including a variety of recording media such as CD, DVD, HD-DVD, and Blu-ray DISC, as well as various types of flash memory such as a Secure Digital (SD) memory card, a memory stick, or a Multi-Media Card (MMC) and provide the synchronized non-audience performance data to the remote location-side control system 200.

In some other embodiments, even when playing videos of past performances or playing video materials such as music videos, through a physical storage medium for a live performance, for example, a means such as Blu-ray, DVD, IPTV's VOD service, it is possible to provide a to-be-controlled device that is illuminated or blinks in synchronization with the live performance of the video by providing control data to the to-be-controlled device possessed by a viewer who watches the video at a remote location. In the case of the storage medium, the control data may be separately generated according to the video material through a post-production process after the performance shooting, such as video editing, mastering, or compensation, and the control data may be recorded on the storage medium together with the performance data. In such a storage medium, in order not to cause a problem in the existing playback device, the performance data or the voice data may be stored and provided as a separate file. The control data separately stored as a separate file may be reproduced and used through a control program or a control device that supports the control of the to-be-controlled device. When the storage medium provides the control data separately from performance data or voice data, the format of control data may be combined with time code information, and may be text information or a formatted XML format. A device at a remote location, which plays back such a storage medium reads the control data while playing the performance data and provides the control data to the to-be-controlled device, enabling a user to experience the to-be-controlled device that operates integrally with the recorded live performance even at a remote location and increasing the sense of presence and immersion in the performance According to an embodiment, the device control unit 135 may generate non-audience performance data by synchronizing the performance data with the control data using the time code information. In this case, the control data synchronized with the performance data may be configured by mapping time code information to the control data so as to be synchronized with the performance data using time code information generated based on the non-audience performance data or time code information generated based on the performance data of the performance hall 20. That is, the performance data of the remote location 30 and the second to-be-controlled device 220 of the remote location 30 may be synchronized with each other using the time code information.

For example, the device control unit 135 may map the control data to the time code information according to the performance time using the time code information generated based on the start time of the performance data, thereby generating the control data synchronized with the performance data.

For example, the device control unit 135 may map the control data to the time code information for each frame in the performance data using the time code information generated based on the playback time of the performance data, thereby generating the control data synchronized with the performance data.

Here, the time code information may be time information generated in units of hours, minutes, seconds, milliseconds, and the like. In the case of an image file, the playback time itself may be used as a time code, or the time code may be generated using a time code generator.

For example, the device control unit 135 may map a start time point at which a to-be-controlled device performs a specific control operation according to the control data to the time code information based on time code information including time information generated in units of hours, minutes, seconds, milliseconds, frames, or the like to generate synchronized control data. According to an embodiment, when the control data of the second to-be-controlled device 220 controlled in correspondence with the performance data does not match the performance data played using the time code information, the device control unit 135 may control the second to-be-controlled device 220 by synchronizing the performance data with the control data by correcting non-audience performance directing data including time information or the time code information of the performance data.

According to an embodiment, the device control unit 135 may transmit non-audience performance data in which performance data is not synchronized with control data corresponding to the performance data to the remote location-side control system 200. That is, the device control unit 135 may transmit the performance data and the control data corresponding to the performance data to the remote location-side control system 200, separately. Accordingly, the device control unit 135 located in the performance hall 20 may control the second to-be-controlled device 220 at the remote location 30 using the control data based on the performance data.

In this case, the device control unit 135 may transmit non-audience performance data in which performance data is not synchronized with control data corresponding to the performance data to the remote location-side control system 200 in real time or sequentially.

Alternatively, the device control unit 135 may transmit the non-synchronized performance data and control data to the remote location-side control system 200 individually through a separate physical storage medium. Here, the performance data and the control data may be transmitted to the remote location-side control system 200 through the same or different storage media.

According to an embodiment, the device control unit 135 may transmit a video previously photographed in a virtual space without spectators to the remote location-side control system 200. For example, the device control unit 135 may transmit non-audience performance data, such as a pre-recorded or music video, to the remote location-side control system 200.

According to an embodiment, the device control unit 135 may generate non-audience performance data by synchronizing the performance data with the control data such that the second to-be-controlled device 220 at the remote location 30 watching the pre-recorded video regardless of the actual performance video is controlled according to the performance data.

According to an embodiment, the device control unit 135 may convert the non-audience performance data into a wireless signal, and transmit the wireless signal to the remote location-side control system 200.

According to an embodiment, the device control unit 135 may broadcast a control signal including the control data synchronized with the performance data to a paired second to-be-controlled device 220 at the remote location 30 to remotely control the to-be-controlled device 220 according to the performance data.

The performance hall-side control system 100 having the above-described structure is located in the area of the performance hall 20, generates non-audience performance data corresponding to the direction of the non-audience performance, and transmits the non-audience performance data to the remote location-side control system 200 at the remote location 30, thereby controlling the second to-be-controlled device 220 at the remote location 30 according to the direction of the non-audience performance.

The remote location-side control system 200 may include the data processing device 210 and the second to-be-controlled device 220 located at the remote location 30. Here, the data processing device 210 and the second to-be-controlled device 220 may be located in the same remote location 30, but are not limited thereto and may be located in different remote locations 30.

The data processing device 210 may simultaneously process the non-audience directing data received from the performance hall-side control system 100. That is, the data processing device 210 may simultaneously control the performance data and the control data synchronized with the performance data and simultaneously control the to-be-controlled devices 220 of the spectators at the remote location 30 while providing the performance data to the spectators at the remote location 30.

According to an embodiment, the data processing device 210 may receive and process the non-audience performance directing data in real time or at a predetermined time interval from the performance hall-side control system 100. In this case, the non-audience performance directing data may be data provided such that a performance is directed in a performance hall or a virtual space without spectators, but is not limited thereto.

According to an embodiment, the data processing device 210 may receive and process non-audience performance directing data through a physical storage medium.

According to an embodiment, the data processing device 210 may individually process the performance data and control data included in the non-audience directing data.

According to an embodiment, the data processing device 210 may individually process the performance data and provide the performance data to spectators in the remote location 30 through a playback device such as a beam projector, a monitor, or a TV. In this case, the second to-be-controlled device 220 at the remote location 30 may be controlled by the performance hall-side control system 100.

According to an embodiment, the data processing device 210 may individually process the control data to control the second to-be-controlled device 220 at the remote location 30.

In this case, when the spectators are located in the plurality of remote locations 30, the data processing device 210 may control the second to-be-controlled devices 220 of the spectators at the remote locations 30 simultaneously or individually.

According to an embodiment, the data processing device 210 may process the performance data based on non-audience performance data. In this case, the non-audience performance data may not include control data based on the performance data.

According to an embodiment, the data processing device 210 may individually process control data.

For example, when the control data of the second to-be-controlled device 220 does not match the performance data played using the time code information, the data processing device 210 may control the second to-be-controlled device 220 by synchronizing the performance data with the control data by correcting non-audience performance directing data including time information or the time code information of the performance data. Such a data processing device 210 may be a device including a video playback function and a remote communication function.

In some other embodiments, the data processing device 210 that analyzes and processes control data at a remote location and transmits the control data to a to-be-controlled device is not limited to a specific device or apparatus and may include various forms or types. For example, in a smart phone, pairing or multi-pairing with a plurality of to-be-controlled devices may be performed for wireless communication such as Bluetooth, and broadcasting may be performed for a plurality of to-be-controlled devices through wireless communication such as Bluetooth without separate pairing. For example, since multi-pairing provided by a device or apparatus capable of Bluetooth pairing such as a smartphone has a limitation that generally up to 8 devices are connected, there may be a situation in which simultaneous control is not possible when there are more than eight to-be-controlled devices in a remote location. It is possible to transmit control data (control signal) for controlling the to-be-controlled devices by operating a Bluetooth broadcasting signal, for example, a beacon signal or an advertisement signal for pairing or bonding. The advertisement signal may include pieces of information such as an access address, an advertiser's address, the advertiser's data, a Universally Unique Identifier (UUID), and the like. In an embodiment of modifying and transmitting an advertisement signal, the advertisement data may be LEDControl1, and the address, access address, and UUID of the advertisement device may be modified and transmitted as control information for a lighting device for light emission. In another embodiment, the advertisement data may be LEDControl1_, and control information may be concatenated with the advertisement data and transmitted in the form of LEDControl1_255.0.0.

The to-be-controlled device operates in a Master (Central) mode, but the to-be-controlled device may operate to receive and analyze only a broadcasting signal without pairing or bonding. Through this, it is possible to control a plurality of cheering light stick devices by receiving a broadcasting signal without directly connecting to a beacon or a peripheral device. There is a continuous same frequency band signal occupation problem that occurs in the multi-pairing process, in which several devices operate as if they are sequentially connected by repeatedly and quickly performing a process of transmitting signals by connecting to each paired device, and since the control data is transmitted in a short time at different times in a distributed manner rather than being transmitted to to-be-controlled devices at the same time, the problem that a plurality of to-be-controlled devices have a synchronization error of several milliseconds may be solved.

The second to-be-controlled device 220 may be a cheering tool possessed by a spectator, which is controlled by the control data in correspondence with performance data performed in the performance hall 20 to provide the effect of enabling the spectator to experience the performance in the actual performance hall. That is, the second to-be-controlled device 220 may be controlled based on the control data in correspondence with a virtual seat generated virtually in the performance hall 20 according to the performance data played through a playback device (not shown). In this case, the second to-be-controlled device 220 may receive control data from the data processing device 210 in a wired/wireless communication method and be controlled.

For example, the second to-be-controlled device 220 may be connected to the data processing device 210 through Bluetooth, wifi, a wired connection, a dongle device, or the like to receive control data synchronized with the performance data together, or may receive the control data synchronized with the performance data together through a separate device (e.g., separate server) or a separate transmission medium.

According to an embodiment, the second to-be-controlled device 220 may be controlled by receiving control data from the performance hall-side control system 100.

For example, the second to-be-controlled device 220 is paired with the device control unit 135 of the performance hall 20 and is controlled in correspondence with the performance data by receiving a control signal including control data broadcast from the device control unit 135.

According to some other embodiments, spectators who possess to-be-controlled devices at a remote location may watch a performance, video or broadcast through a device capable of playing performance data, and the control data is transmitted simultaneously with the playback of the performance data, so that the performance data and the control data are set with the same timing and the to-be-controlled devices are controlled to emit light in accordance with the performance data being played. The control data and the performance data are received through a separate receiving device, and the performance data may be played back on any device capable of video playback, for example, mobile devices, TVs, set-top boxes, desktops, portable computing devices, and the like. The control data may be received through a separate device or apparatus from the performance data and the received control data may be transmitted to the to-be-controlled device.

According to some other embodiments, a spectator holding a to-be-controlled device at a remote location may execute a process of receiving the performance data and the control data through a single device, and a process of performing video playback and transmission of the control data to the to-be-controlled device through the single device, together. For example, by receiving performance data and control data through a smartphone, the performance data is played back on the smartphone, and at the same time, the control data is analyzed and transmitted to a nearby to-be-controlled device by a short-range wireless communication signal such as Bluetooth to synchronize the performance data and the control data.

The remote location-side control system 200 having the above-described structure may control the second to-be-controlled devices 220 possessed by spectators in the remote location 30 using the non-audience performance data received from the performance hall 20 to enable the spectators to undergo the same experience as watching a performance at the performance hall 20.

On the other hand, in the present embodiment, the remote location directing system 14 may further include the above-described server 140, but is not limited thereto.

According to an embodiment, the server 140 may transmit the non-audience data generated by the performance hall-side control system 100 to the remote location-side control system 200.

According to an embodiment, the server 140 may generate control data capable of controlling the second to-be-controlled device 220 in the remote location 30 based on the performance data received from the remote location-side control system 200.

According to an embodiment, the server 140 may remotely control the second to-be-controlled device 220 at the remote location 30 by broadcasting a control signal for controlling the to-be-controlled device 220 based on the control data.

Figure 11:
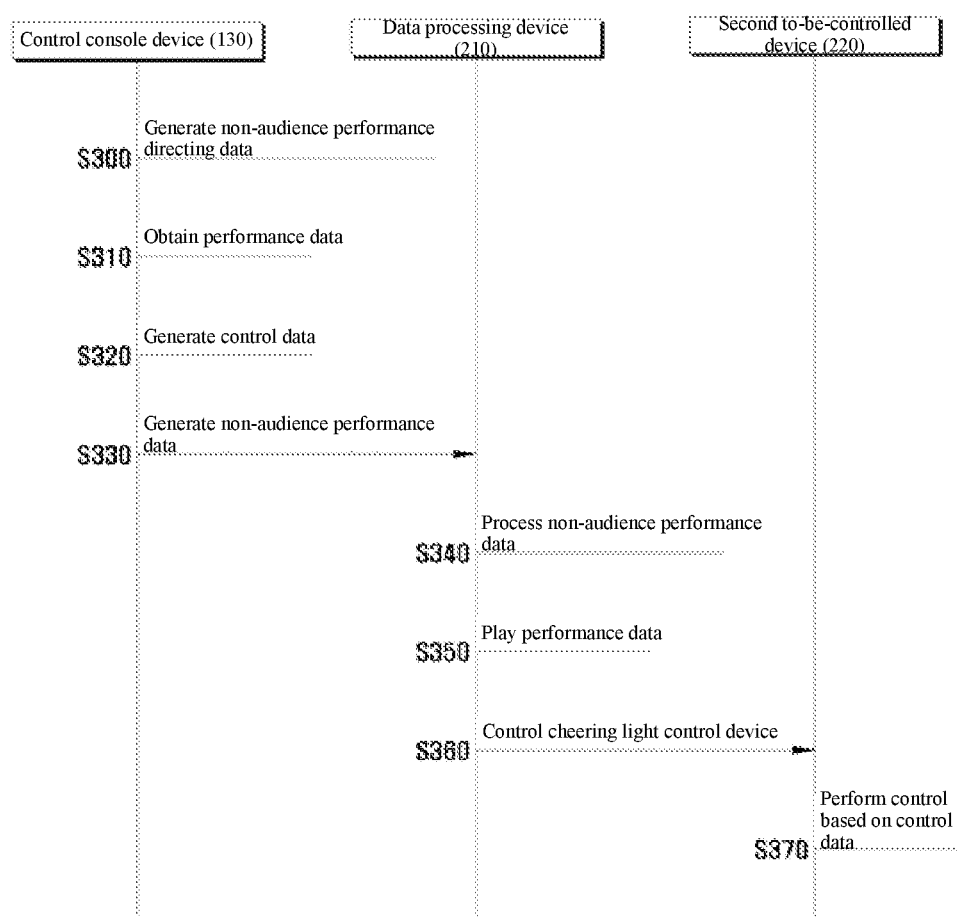
FIG. 11 is a flowchart illustrating a performance directing method for controlling to-be-controlled devices of spectators at a remote location in correspondence with a non-audience performance according to another embodiment illustrated in FIG. 10.

FIG. 11 is a flowchart illustrating a performance directing method for controlling to-be-controlled device of spectators at a remote location according to a non-audience performance according to another embodiment illustrated in FIG. 10.

First, referring to FIG. 11, the control console device 130 may generate non-audience performance directing data in order to make a non-audience performance in the performance hall 20 (S300).

Alternatively, the control console device 130 may receive and store the non-audience performance directing data from another device in advance, or through another storage medium or transmission medium.

Next, the control console device 130 may obtain performance data through the non-audience performance performed in the area of the performance hall 20 based on the non-audience performance directing data (S310).

In this case, the control console device 130 may preferably obtain the performance data in real time, but is not limited thereto, and obtain performance data recorded through a separate physical storage medium later.

Next, the control console device 130 may generate control data corresponding to the performance data obtained based on the non-audience performance directing data (S320).

Here, the control data may be data capable of controlling the second to-be-controlled device 220 of the remote location-side control system 200 in correspondence with the performance data performed in the performance hall 20 in order to represent the performance directing effect in correspondence with the actual or virtual seats in the performance hall 20.

Next, the control console device 130 may synchronize the performance data and the control data corresponding to the performance data based on non-audience performance directing data to generate non-audience performance data and provide the non-audience performance data to the remote location-side control system 200 (S330).

According to an embodiment, the control console device 130 may provide the generated non-audience performance data to the remote location-side control system 200 in real time.

According to an embodiment, the control console device 130 may provide the generated non-audience performance data to the remote location-side control system 200 at regular time intervals.

According to an embodiment, the control console device 130 may convert the generated non-audience performance data into streaming data and provide the streaming data data to the remote location-side control system 200.

According to an embodiment, the control console device 130 may record the generated non-audience performance data in a separate physical storage medium and provide the non-audience performance data to the remote location-side control system 200.

According to an embodiment, the control console device 130 may convert the performance data and the control data individually, record them in a separate physical storage medium, and provide them to the remote location-side control system 200.

According to an embodiment, the control console device 130 may synchronize the control data corresponding to the performance data to be apart at a predetermined time interval and provide the control data to the remote location-side control system 200.

Next, the data processing device 210 may simultaneously process the received non-audience performance data (S340).

According to an embodiment, the data processing device 210 may receive and process the non-audience performance directing data in real time or at a predetermined time interval from the performance hall-side control system 100.

Next, the data processing device 210 may simultaneously control the performance data and the control data synchronized with the performance data to play and provide the performance data to the spectators at the remote location 30 (350) and simultaneously control the to-be-controlled devices 220 of the spectators at the remote location 30 (S360).

According to an embodiment, the data processing device 210 may receive and process the non-audience performance directing data in real time or at a predetermined time interval from the performance hall-side control system 100.

According to an embodiment, the data processing device 210 may receive and process non-audience performance directing data through a physical storage medium.

According to an embodiment, the data processing device 210 may individually process the performance data and control data included in the non-audience directing data.

Finally, the second to-be-controlled device 220 may be controlled based on the control data corresponding to the current playback section of the performance data (S370).

For example, the second to-be-controlled device 220 may selectively receive control data corresponding to group information pre-stored in the seconnnd to-be-controlled device 220 based on the control data corresponding to the current playback section of the performance data and operate according to the light emission state (e.g., light emission color) corresponding to its own group information based on the received control data (S110).

According to an embodiment, the second to-be-controlled device 220 may be controlled by receiving control data from the performance hall-side control system 100.

Due to this configuration, regardless of the presence or absence of on-site spectators at the video shooting site, it is possible to provide a remote directing method and a remote directing system that precisely control to-be-controlled devices of remote spectators who want to enjoy the performance in various forms such as real-time or past video or live video materials which are received from the remote location according to timing of a performance video.

According to the configuration described above, it is possible to provide a situation-adaptive remote directing method and remote directing system that combine a video played for spectators at a remote location and a control signal that controls to-be-controlled devices possessed by the spectators at the remote location and transmit them as one data, or transmit them separately.

According to the configuration described above, it is possible to provide a remote directing method and remote directing system that control a plurality of to-be-controlled devices located in a short distance through one device of a spectator when a control signal for controlling a to-be-controlled device possessed by a spectator at a remote location is provided from the spectator at the remote location.

According to the configuration described above, it is possible to provide a remote location directing method and a remote location directing system capable of providing a to-be-controlled device precisely synchronized with a video being played by a spectator at a remote location by including a means for performing synchronization in a control signal for controlling the to-be-controlled device possessed by the spectator at the remote location.

According to the configuration described above, it is possible to provide a remote location directing method and a remote location directing system, which control the to-be-controlled device possessed by the remote viewer to respond to changes or reactions in the video or content and control the light emission capable of providing a controlled device in order to maximize the immersion or content effect of viewers who enjoy content or video in real time or in non-real time at a remote location, not limited to the performance.

The steps of a method or algorithm described in connection with the embodiments of the present disclosure may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

According to the inventive concept, it is possible to implement and provide the performance directing effect produced on the spectator seats of the performance hall to spectators at a remote location in the same way. Therefore, the spectators at a remote location can have the same experience as watching the performance at the actual performance site.

According to the inventive concept, it is possible to synchronize not only the to-be-controlled device in the performance hall but also the to-be-controlled device at a remote location to control them in real time by using a control console device used in the performance hall.

According to the inventive concept, it is possible to perform synchronization with the to-be-controlled device at a remote location by using the control data generated to control the to-be-controlled device of the performance hall.

According to the inventive concept, spectators at the remote location can have the same experience as watching a performance at the performance hall regardless of time/ place by providing performance data of the performance hall to spectators at the remote location using a physical storage medium.

According to the inventive concept, when a playback delay phenomenon occurs in the case of playing performance data, it is possible to control the to-be-controlled devices similarly with the performance data to maximize the sense of immersion of spectators by synchronizing the performance data with the to-be-controlled device using time code information to match the performance data with the to-be-controlled device.

According to the inventive concept, it is possible to control the to-be-controlled devices while preventing possible playback errors or playback delays when playing the performance data, by simultaneously controlling the performance data and control data synchronized with the performance data by devices such as smartphones, tablets, PCs, set-top boxes, receivers, consoles, or the like.

According to the inventive concept, it is possible to control to-be-controlled devices at the remote location in real time in correspondence with the performance watched by the spectators at the remote location, by providing non-audience performance data and control data to spectators at the remote location in real time regardless of the presence or absence of spectators at the performance or filming site. Therefore, the spectators at a remote location can have the same experience as watching the performance at the performance site.

According to the inventive concept, spectators at the remote location can have the same experience as watching a performance at the performance hall safely regardless of time/place by providing non-audience performance data of the performance hall to spectators at the remote location using a physical storage medium.

According to the inventive concept, the inventive concept is not limited to performances. A viewer, who watches various types of content, for example, movies, dramas, animations, or the like at a remote location, possesses a to-be-controlled device and a control signal for controlling the to-be-controlled device is provided, thus providing various special effects that is highly related to various types of content and is synchronized with the timing of the content, and maximizing the immersion and viewing effect of the content.

However, effects of the inventive concept may not be limited to the above-described effects. Although not described herein, other effects of the inventive concept can be clearly understood by those skilled in the art from the following description. While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A remote location directing system comprising:
   a control console device configured to generate performance data performed in a performance hall and control data for controlling to-be-controlled devices at a remote location based on performance directing data;
   a data processing device configured to provide the performance data to spectators at the remote location and process the control data synchronized with the performance data together with the performance data; and
   to-be-controlled devices controlled to correspond to the performance data based on the control data corresponding to a current playback section of the performance data,
   wherein the control data is configured by mapping time code information to the control data to be synchronized with the performance data using the time code information, and
   wherein the to-be-controlled devices are possessed by the spectators at the remote location,
   wherein
   the control data is included in a partial region of a pixel of a video included in the performance data, the partial region of the pixel corresponds to a non-recognized region of the video, and the non-recognized region corresponds to an outer portion of a video area of the video when the video is played.

2. The remote location directing system of claim 1, wherein the data processing device includes
   a performance data processing device configured to receive and process the performance data; and
   a control data processing device configured to receive and process the control data.

3. The remote location directing system of claim 2, wherein the control data processing device is configured to extract control data mapped to time code information corresponding to the current playback section of the performance data from the control data, and providing the control data to the to-be-controlled devices.

4. The remote location directing system of claim 1, wherein the control data is included in a partial region of an empty channel region among multi-channel track information of the performance data, the control data is included in a partial region of a frame, or the control data is included in the partial region of the pixel among multi-channel track information of the performance data.

5. The remote location directing system of claim 1, wherein the control data synchronized with the performance data is broadcast from a server, and
   wherein the to-be-controlled devices at the remote location are controlled to implement a performance directing effect in response to the performance data by a control signal including the control data broadcast from the server when the performance data is played.

6. The remote location directing system of claim 1, the control console device is configured to convert the performance data into streaming data and transmitting the streaming data to the data processing device.

7. The remote location directing system of claim 1, wherein the performance data includes at least one of video, audio, image and text.

8. The remote location directing system of claim 1, wherein the performance data and the control data are provided using a physical storage medium.

* * * * *